United States Patent
Yee et al.

(10) Patent No.: US 7,447,436 B2
(45) Date of Patent: **\*Nov. 4, 2008**

(54) OPTICAL COMMUNICATIONS USING MULTIPLEXED SINGLE SIDEBAND TRANSMISSION AND HETERODYNE DETECTION

(75) Inventors: Ting K. Yee, Foster City, CA (US);
Peter H. Chang, San Jose, CA (US);
Chin-Sheng Tarng, San Jose, CA (US);
Gregory M. Cutler, Cupertino, CA (US); Slava Yazhgur, Daly City, CA (US); Ji Li, Cupertino, CA (US);
Laurence J. Newell, Saratoga, CA (US);
James F. Coward, Los Gatos, CA (US);
Michael W. Rowan, Los Gatos, CA (US); Norman L. Swenson, Fremont, CA (US); Matthew C. Bradshaw, Palo Alto, CA (US)

(73) Assignee: Forster Energy LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/514,381

(22) Filed: Aug. 31, 2006

(65) Prior Publication Data

US 2007/0133993 A1 Jun. 14, 2007

Related U.S. Application Data

(63) Continuation of application No. 09/918,886, filed on Jul. 30, 2001, now Pat. No. 7,146,103, and a continuation-in-part of application No. 09/728,373, filed on Nov. 28, 2000, now Pat. No. 7,209,660, and a continuation-in-part of application No. 09/474,659, filed on Dec. 29, 1999, now abandoned.

(51) Int. Cl.
*H04B 10/08* (2006.01)
*H04B 10/04* (2006.01)
*H04B 10/06* (2006.01)
*H04B 10/145* (2006.01)
*H04B 10/148* (2006.01)
*H04J 14/02* (2006.01)
*H04J 1/00* (2006.01)
*H04J 1/04* (2006.01)
*H04J 1/08* (2006.01)

(52) U.S. Cl. .................. 398/95; 398/68; 398/82; 398/91; 398/152; 398/163; 398/184; 398/196; 398/205

(58) Field of Classification Search .................. 398/95, 398/196
See application file for complete search history.

(56) References Cited

U.S. PATENT DOCUMENTS 2,156,278 A * 5/1939 Dekker ................. 370/488
(Continued)

FOREIGN PATENT DOCUMENTS

EP 0328156 8/1989
(Continued)

OTHER PUBLICATIONS

Bachus, et al., Coherent Optical Multicarrier Systems; Journal of Lightwave Technology, vol. 7 No. 2, Feb. 1989, pp. 375-384.
(Continued)

*Primary Examiner*—Kenneth Vanderpuye
*Assistant Examiner*—David S Kim

(57) ABSTRACT

A transmitter subsystem generates an optical signal which contains multiple subbands of information. The subbands have different polarizations. For example, in one approach, two or more optical transmitters generate optical signals which have different polarizations. An optical combiner optically combines the optical signals into a composite optical signal for transmission across an optical fiber. In another aspect, each optical transmitter generates an optical signal containing both a lower optical sideband and an upper optical sideband (i.e., a double sideband optical signal). An optical filter selects the upper optical sideband of one optical signal and the lower optical sideband of another optical signal to produce a composite optical signal.

27 Claims, 28 Drawing Sheets

U.S. PATENT DOCUMENTS

| | | | |
|---|---|---|---|
| 3,752,992 | A | 8/1973 | Fluhr |
| 4,061,577 | A | 12/1977 | Bell |
| 4,701,904 | A | 10/1987 | Darcie |
| 4,807,227 | A | 2/1989 | Fujiwara et al. |
| 4,841,519 | A * | 6/1989 | Nishio ........................ 398/91 |
| 4,953,156 | A | 8/1990 | Olshansky et al. |
| 5,140,453 | A | 8/1992 | Tsushima et al. |
| 5,162,937 | A | 11/1992 | Heidemann et al. |
| 5,272,556 | A | 12/1993 | Faulkner |
| 5,305,134 | A * | 4/1994 | Tsushima et al. ............. 398/91 |
| 5,351,148 | A | 9/1994 | Maeda et al. |
| 5,387,927 | A | 2/1995 | Look et al. |
| 5,430,568 | A | 7/1995 | Little et al. |
| 5,546,190 | A | 8/1996 | Hill et al. |
| 5,559,561 | A | 9/1996 | Wei |
| 5,576,874 | A | 11/1996 | Czerwiec et al. |
| 5,589,969 | A | 12/1996 | Taga et al. |
| 5,589,970 | A * | 12/1996 | Lyu et al. ..................... 398/95 |
| 5,596,436 | A | 1/1997 | Sargis et al. |
| 5,680,238 | A | 10/1997 | Masuda |
| 5,724,169 | A | 3/1998 | LaGasse |
| 5,875,273 | A * | 2/1999 | Mizrahi et al. ................ 385/37 |
| 5,896,211 | A | 4/1999 | Watanabe |
| 5,920,414 | A * | 7/1999 | Miyachi et al. .............. 398/14 |
| 5,930,231 | A | 7/1999 | Miller et al. |
| 5,956,166 | A | 9/1999 | Ogata et al. |
| 5,956,356 | A * | 9/1999 | Bergmann et al. ........... 372/32 |
| 6,038,357 | A | 3/2000 | Pan |
| 6,058,227 | A | 5/2000 | Wong |
| 6,067,181 | A * | 5/2000 | Mizrahi ...................... 398/196 |
| 6,134,033 | A * | 10/2000 | Bergano et al. ............ 398/184 |
| 6,236,480 | B1 | 5/2001 | Atlas |
| 6,295,147 | B1 * | 9/2001 | Yamane et al. ................. 398/9 |
| 6,327,064 | B1 * | 12/2001 | Zhu ........................... 398/196 |
| 6,342,961 | B1 | 1/2002 | Bergano et al. |
| 6,421,151 | B1 * | 7/2002 | Berger et al. ................... 398/79 |
| 6,459,515 | B1 | 10/2002 | Bergano |
| 6,493,131 | B1 * | 12/2002 | Tarng et al. ................. 359/326 |
| 6,580,535 | B1 | 6/2003 | Schonfelder |
| 6,735,395 | B1 * | 5/2004 | Bai ............................. 398/95 |
| 6,766,116 | B2 * | 7/2004 | Webb ........................ 398/196 |
| 6,850,713 | B2 * | 2/2005 | Kikuchi et al. .............. 398/201 |
| 6,904,240 | B1 | 6/2005 | Suga et al. |
| 2002/0076132 | A1 * | 6/2002 | Peral et al. ..................... 385/15 |
| 2004/0208428 | A1 * | 10/2004 | Kikuchi et al. ................ 385/24 |

FOREIGN PATENT DOCUMENTS

| | | |
|---|---|---|
| EP | 0496298 | 7/1992 |
| EP | 0507508 | 10/1992 |
| EP | 0717521 | 6/1996 |
| EP | 0756393 | 1/1997 |
| GB | 2179517 | 3/1987 |
| GB | 2179817 | 3/1987 |

OTHER PUBLICATIONS

Glance, et al., WDM Coherent Optical Star Network, Journal of Lightwave Technology, vol. 6 No. 1, Jan. 1988, pp. 67-72.

Tsukamoto, et al., Coherent Fiber-Optic Microcellular Radio Communication System Using RF-to-optic Direct Conversion Scheme, IEEE Global Telecommunications Conference, 1995. GLOBECOM '95, Nov. 13-17, 1995: 1987-1991 vol. 3.

Invitation to Pay Additional Fees, Annex to Form PCT/ISA/206 Communication Relating to the Results of the Partial International Search, International Application No. PCT/US02/04582, Jun. 16, 2003, 6 pages.

Campos, et al., "16-Gbit/s time- and polarization-division-multiplexed system using a novel compensation technique," Optical Fiber Communication Conference Technical Digest Series (Washington, DC 1994), vol. 4, pp. 14-15.

Hill, et al., "Optical Polarization Division Multiplexing at 4 Gb/s," IEEE Photonics Technology Letters (May 1992), vol. 4, No. 5, pp. 500-502.

Kawanishi, et al., "100 Gbit/s all-optical demultiplexing using four-wave mixing in a travelling wave laser diode amplifier," Electronics Letters (Jun. 9, 1994), vol. 30, No. 12, pp. 981-982.

Business Wire, "Harmonic Lightwaves Announces Availability of First MCNS-Compliant QAM Modulator; TRANsend QAM is a Vital Component for Delivering Digital Services", Nov. 18, 1997.

Corvaja, et al., "Bit Error Rate Evaluation of Dual-Filter Heterodyne FSK Optical System," Journal of Optical Communications, Dec. 1, 1994, vol. 15, No. 6, Berlin, DE, pp. 208-213.

CVIJETIC, "Coherent and Nonlinear Lightwave Communications," Artech House, Boston, MA, 1996.

Dai, et al., "Hybrid AM/QAM Video Trunking Lightwave Systemswith Cascaded EDFAs," Conf. Proc. LEOS, 97 Annual Meeting, IEEE Lasers & Electro Optic Society, 1997, vol. 1, pp. 319-320.

Douverne, et al., "Ein 64-QAM Modem fur SDH-Richtfunkgerate mit integriertem Kreuzpolarisationsentkoppler", vol. 40, No. 11, Mar. 1, 1994, pp. 89-100.

Fong, et al., "Linewidth-Insensitive Coherent AM Analog Optical Links Using Semiconductor Lasers," IEEE Photonics Technology Letter, Apr. 1, 1993, vol. 5, No. 4, New York, pp. 469-471.

Fuse, et al., "Development of 128 Optical Distribution System of 150 chs AM/QAM Hybrid Signals", Electronics and Communications in Japan, Nov. 1996, vol. 79, Issue 11, pagt 1, pp. 65-77.

Green, "Fiber Optic Networks," 1993, Prentice-Hall, Inc., Englewood Cliffs, New Jersey, p. 331, line 4-line7, figure 9-1.

Hiramatsu, et al., "Hypermedia Photonic Information Network Based on WDM-SCM Broadcast and Select Switching," Conference Proceedings, Leos '96 9th Annual Meeting, IEEE Lasers and ElectroOptics Society 1996 Annual Meeting (Cat. No. 96CH35895), Boston, MA, Nov. 18-19, 1996, pp. 312-313.

Ho, et al., "Hybrid WDM Digital Trunking System for both HFC and FTTC Access Networks," Digest IEEEE/LEOS 1996 Summer Topi9cal Meetings (Cat. No. 96th 8164), NY, NY, pp. 37-38.

Kanno, "Fiber Optic Subcarrier Multiplexing Transport for Broadband Subscriber Distribution Network", IEEE Intl. Conference on Communications Boston ICC/89 World Prosperity Through Communications, Jun. 11-14, '989, Boston, MA, vol. 2, pp. 996-1003.

Kavehrad, "Fiber-Optic Transmission of Microwave 64-QAM Signals", IEEE Journal on Selected Areas in Communications, vol. 8, No. 7, Sep. 1990, pp. 1320-1326.

Leber, "Digital Transmission on Electric Subcarriers in Optical Fiber Videocommunication Systems", Optics Communications, Oct. 15, 1987, vol. 64, No. 2, pp. 120-126.

Li, "Development of AM/QAM Hybrid Optical SCM Transmission System", Proceedings of the International Conference on Communication Technology ICCT '96, May 5-7, 1996, Beijing, China, vol. 1, pp. 575-577.

Lu, et al., "Broad-Band AM-VSB/64 QAM Cable TV System Over Hybrid Fiber/Coax Network," IEEE Photonics Technology Letters, vol. 7, No. 4, Apr. 1995, pp. 330-332.

Nakamura, et al., "Advanced Techniques for Super Multi-Carrier Digital Microwave Radio with Trellis-Coded 256 QAM Modulation," NTT Radio Communication Systems Laboratories, pp. 389-394.

Nishikido, et al., "Multiwavelength Securely-Authenticated Broadcast Network", 11th International Conference on Integrated Optics and Optical Fibre Communications, 23rd European Conference on Optical Communications IOOC-ECOC 97, (Fonf. Publ. No. 448), Sep. 22, 1997, pp. 17-20.

Ohtsuka, et al., "256-QAM Subcarrier Transmission for Broadband Distribution Networks", NTT Radio Communications Systems Laboratories, GlobeCom '91, pp. 1817-1822.

Park, et al., "1550-nm Transmission of Digitally Modulated 28-GHz Subcarriers Over 77 km of Nondispersion Shifted Fiber", IEEE Photonics Technology Letters, Feb. 1997, vol. 9, Issue 2, pp. 256-258.

Ryan, "WDM: North American Deployment Trends", IEEE Communications Magazine, Feb. 1998, pp. 40-44.

Ryu, "Coherent Lightwave Communcation Systems", Artech House, Boston, MA, 1995.

Sargis, et al., "10-Gb/s Subcarrier Multiplexed Transmission over 490 km of Ordinary Single-Mode Fiber without Dispersion Compensation", IEEE Photonics Technology Letters, vol. 9, No. 12, Dec. 1997, pp. 1658-1660.

Schlump, et al., "Electronic equalization of PMD and chromatic dispersion induced distortion after 100 km standard fibre at 10 Gbit/s", Proceedings of the European Conference on Optical Communication, Sep. 20, 1998, pp. 535-536.

Swaminathan, et al, "The end-to-end bit error performance of 64-quadrature amplitude modulated signals in a hybrid AM-vestigial sideband/QAM fiber-optic video transmission system", Proceedings of SPIE International Society for Optical Engineering, vol. 2917, pp. 274-282.

Tai, et al., "Eight-Way, 70-km Transmission of 33-Channel 64-QAM Signals Utilizing a 1.3-μm External Modulation System and Semiconductor Optical Amplifier", IEEE Photonics Technology Letters, vol. 8, No. 9, Sep. 1996, pp. 1244-1248.

Tang, "Multi-Gigabit Fiber-Optic Video Distribution Network Using BPSK Microwave Subcarriers", IEEE 1989 MTT-S Intl. Microwave Symp Digest, Jun. 13-15, 1989, Long Beach, CA, vol. 2, pp. 697-701.

Wilson, "Capacity of QAM SCM systems utilising optically linearised Mach-Zehnder modulator as transmitter", Electronic Letters, vol. 34, No. 25, Dec. 10, 1998, pp. 2372-2374.

Kitayama, "Highly spectrun efficient OFDM/PDM wireless networks by using optical SSB modulation", Journal of Lightwave Technology, vol. 16, No. 6, Jun. 1998, pp. 969-976.

Othonos, "Fiber Bragg gratings", Review of Scientific Instruments, vol. 68, Issue 12, Dec. 1997, pp. 4309-4341.

Ramaswami, et al., "Optical Networks: A Practical Perspective", San Francisco, Morgan Kaufman Publishers, 1998.

Watanabe, et al., "Optical coherent braod-band transmission for long-haul and distribution systems using subcarrier multiplexing", Journal of Lightwave Technology, vol. 11, No. 1, Jan. 1993, pp. 116-127.

* cited by examiner

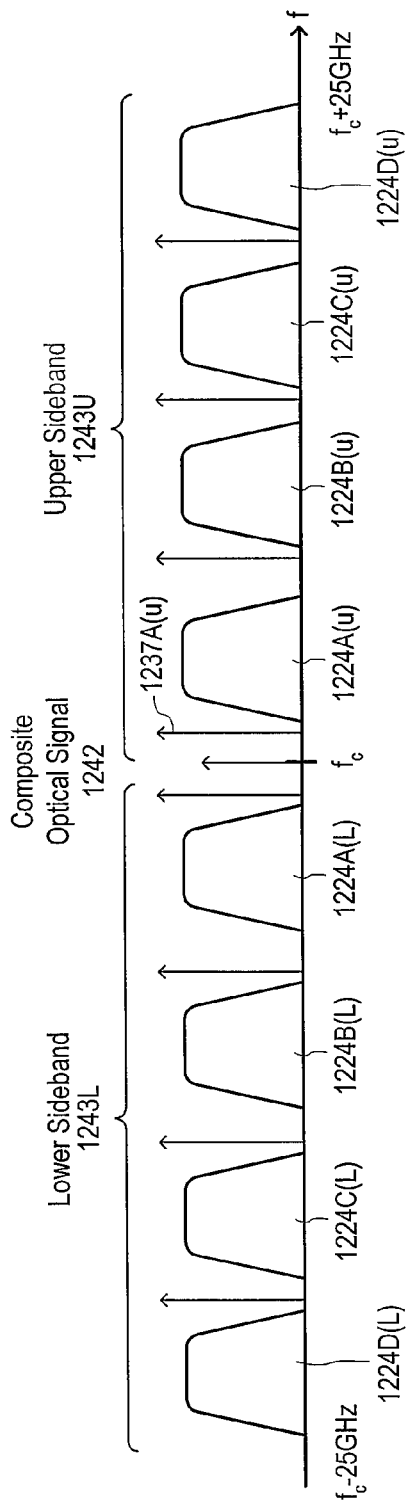
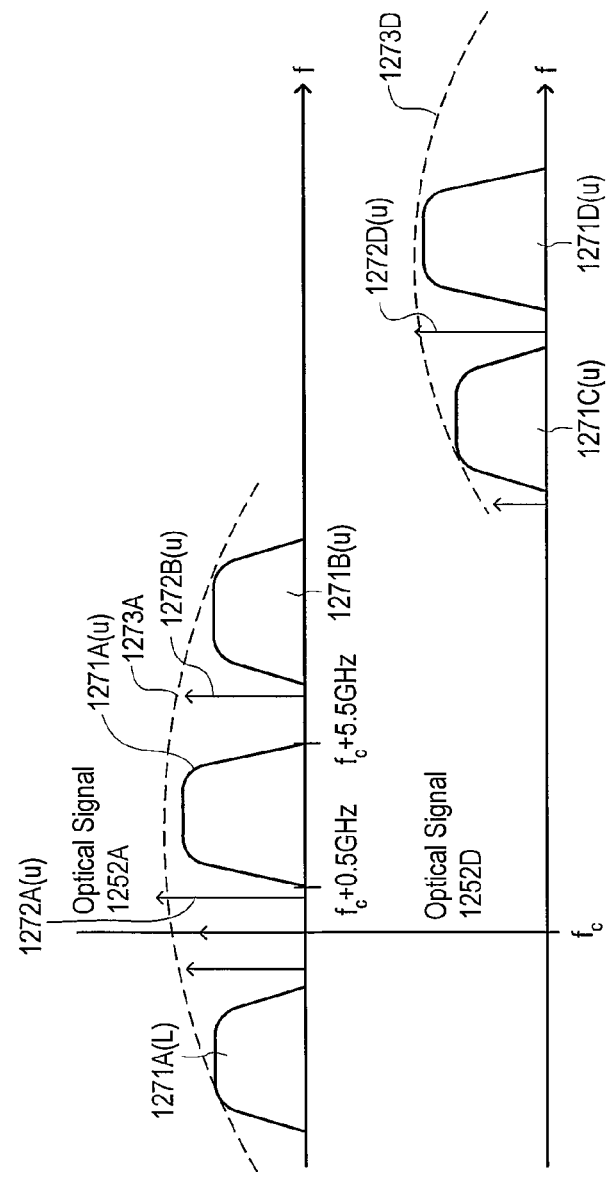
FIG. 13B
FIG. 13C

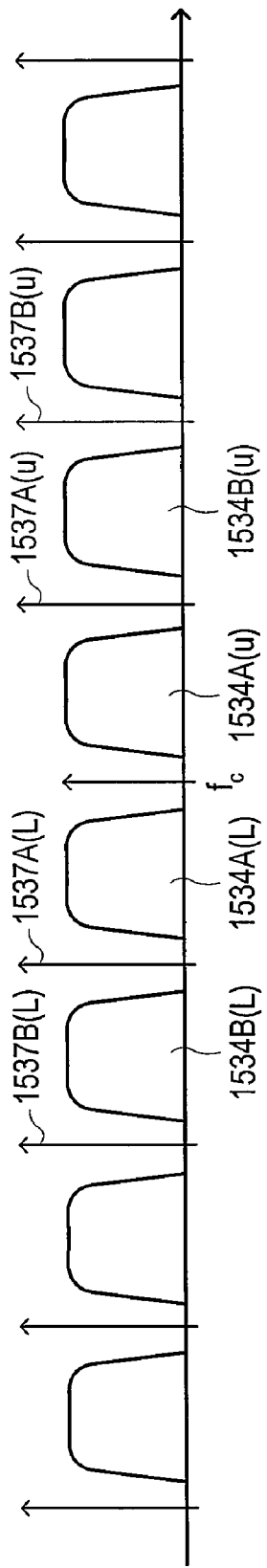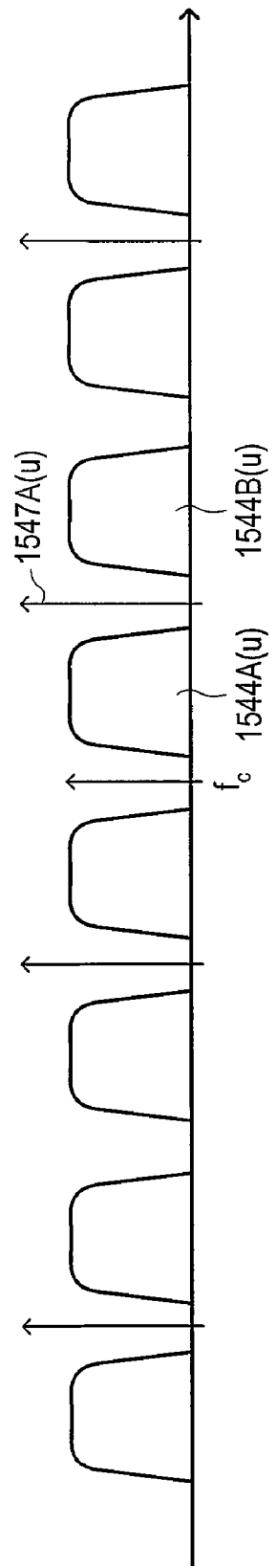

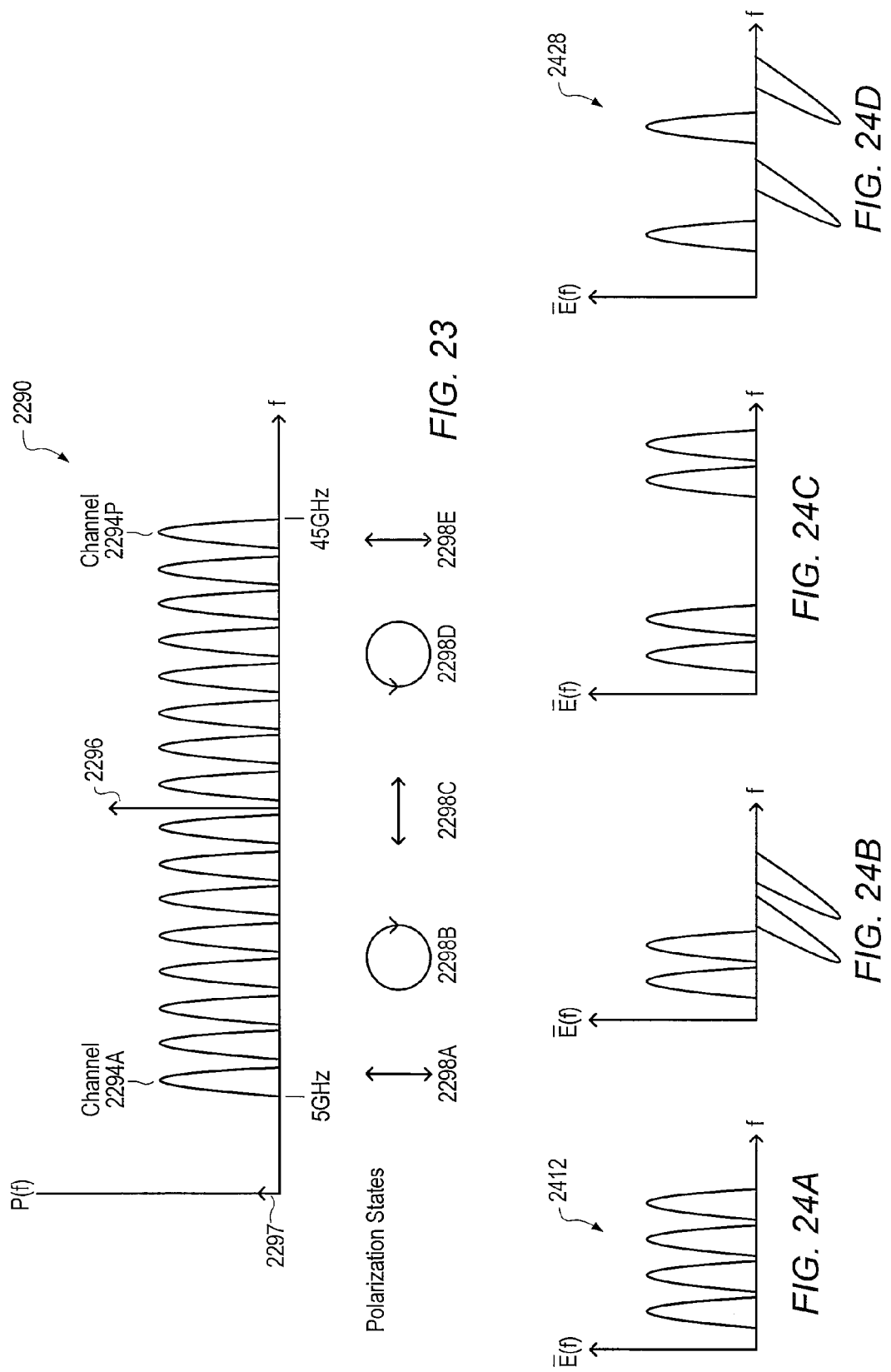

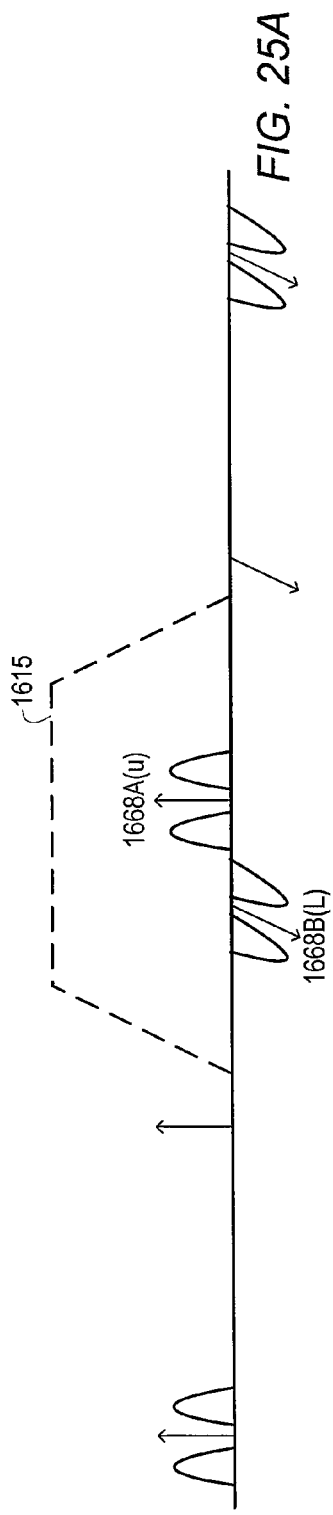
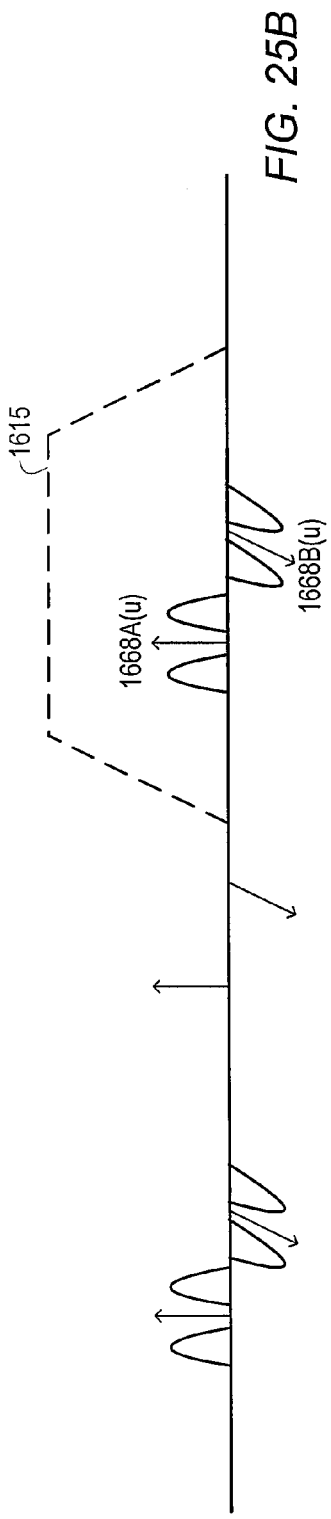
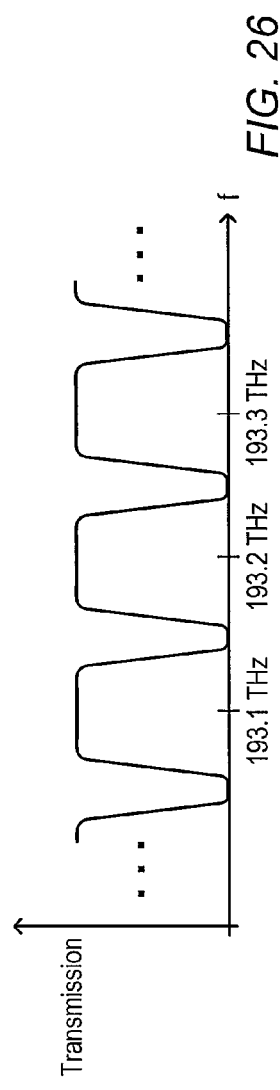

OPTICAL COMMUNICATIONS USING MULTIPLEXED SINGLE SIDEBAND TRANSMISSION AND HETERODYNE DETECTION

CROSS-REFERENCE TO RELATED APPLICATIONS

This application is a continuation-in-part of pending U.S. patent application Ser. No. 09/728,373, "Optical Communications System Using Heterodyne Detection", by Ting K. Yee and Peter H. Chang, filed Nov. 28, 2000, now U.S. Pat. No. 7,209,660 which is a continuation-in-part of pending U.S. patent application Ser. No. 09/474,659, "Optical Communications System Using Heterodyne Detection", by Ting K. Yee and Peter H. Chang, filed Dec. 29, 1999 (now abandoned).

This application claims the benefit of U.S. Provisional Patent Application Ser. No. 60/265,251, "Fiber Optic Communications Using Optical Single Sideband Transmission Including Using Interleaver Filters and Heterodyne Detection and Apparatus for Impairment Compensation Using Nonlinear Phase Conjugation," by Ting K. Yee, et al., filed Jan. 30, 2001.

This application relates to pending U.S. patent application Ser. No. 09/746,370, "Wavelength-Locking of Optical Sources," by Shin-Sheng Tarng, et al., filed Dec. 20, 2000 (now U.S. Pat. No. 6,483,131, issued Dec. 10, 2002).

This application also relates to pending U.S. patent application Ser. No. 09/747,261, "Fiber Optic Communications using Optical Single Sideband Transmission and Direct Detection," by Ting K. Yee, Peter H. Chang, and James F. Coward, filed Dec. 20, 2000 (now abandoned).

This application also relates to pending U.S. patent application Ser. No. 09/854,153, "Channel Gain Control For An Optical Communications System Utilizing Frequency Division Multiplexing," by Laurence J. Newell and James F. Coward, filed May 11, 2001; and pending U.S. patent application Ser. No. 09/569,761, "Channel Gain Control For An Optical Communications System Utilizing Frequency Division Multiplexing," by Laurence J. Newell and James F. Coward, filed May 12, 2000 (now abandoned).

This application also relates to pending U.S. patent application Ser. No. 09/405,367, "Optical Communications Networks Utilizing Frequency Division Multiplexing," by Michael W. Rowan, et al., filed Sep. 24, 1999 (now U.S. Pat. No. 6,529,303, issued Mar. 4, 2003); which is a continuation-in-part of pending U.S. patent application Ser. No. 09/372,143, "Optical Communications Utilizing Frequency Division Multiplexing and Wavelength-Division Multiplexing," by Peter H. Chang, et al., filed Aug. 20, 1999 (now abandoned); which is a continuation-in-part of U.S. patent application Ser. No. 09/229,594, "Electrical Add-Drop Multiplexing for Optical Communications Networks Utilizing Frequency Division Multiplexing," by David B. Upham, et al., filed Jan. 13, 1999 (now U.S. Pat. No. 6,452,945, issued Sep. 17, 2002); which is a continuation-in-part of U.S. patent application Ser. No. 09/035,630, "System and Method for Spectrally Efficient Transmission of Digital Data over Optical Fiber", by Michael W. Rowan, et al., filed Mar. 5, 1998 (now abandoned).

The subject matter of all of the foregoing applications is incorporated herein by reference.

BACKGROUND OF THE INVENTION

1. Field of the Invention

This invention relates generally to optical fiber communications, and more particularly, to the use of single sideband transmission and heterodyne detection for optical fiber communications systems.

2. Description of the Related Art

As the result of continuous advances in technology, particularly in the area of networking, there is an increasing demand for communications bandwidth. For example, the growth of the Internet, home office usage, e-commerce and other broadband services is creating an ever-increasing demand for communications bandwidth. Upcoming widespread deployment of new bandwidth-intensive services, such as xDSL, will only further intensify this demand. Moreover, as data-intensive applications proliferate and data rates for local area networks increase, businesses will also demand higher speed connectivity to the wide area network (WAN) in order to support virtual private networks and high-speed Internet access. Enterprises that currently access the WAN through T1 circuits will require DS-3, OC-3, or equivalent connections in the near future. As a result, the networking infrastructure will be required to accommodate greatly increased traffic.

Optical fiber is a transmission medium that is well-suited to meet this increasing demand. Optical fiber has an inherent bandwidth which is much greater than metal-based conductors, such as twisted pair or coaxial cable. There is a significant installed base of optical fibers and protocols such as SONET have been developed for the transmission of data over optical fibers. Typical communications system based on optical fibers include a transmitter, an optical fiber, and a receiver. The transmitter converts the data to be communicated into an optical form and transmits the resulting optical signal across the optical fiber to the receiver. The receiver recovers the original data from the received optical signal. Recent advances in transmitter and receiver technology have also resulted in improvements, such as increased bandwidth utilization, lower cost systems, and more reliable service.

However, current optical fiber systems also suffer from drawbacks which limit their performance and/or utility. For example, optical fibers typically exhibit dispersion, meaning that signals at different frequencies travel at different speeds along the fiber. More importantly, if a signal is made up of components at different frequencies, the components travel at different speeds along the fiber and will arrive at the receiver at different times and/or with different phase shifts. As a result, the components may not recombine correctly at the receiver, thus distorting or degrading the original signal. In fact, at certain frequencies, the dispersive effect may result in destructive interference at the receiver, thus effectively preventing the transmission of signals at these frequencies. Dispersion effects may be compensated by installing special devices along the fiber specifically for this purpose. However, the additional equipment results in additional power loss (e.g., insertion loss) as well as in additional cost, and different compensators will be required for different types and lengths of fiber. Other fiber effects, such as fiber nonlinearities, can similarly degrade performance.

As another example, the transmitter in an optical fiber system typically includes an optical source, such as a laser, and an external modulator, such as a Mach-Zender modulator (MZM). The source generates an optical carrier and the modulator is used to modulate the optical carrier with the data to be communicated. In many applications, linear modulators are preferred in order to increase the performance of the overall system. MZMs, however, are inherently nonlinear devices. Linear operation is approximated by biasing the MZM at its quadrature point and then limiting operation of the MZM to a small range around the quadrature point, thus reducing the effect of the MZM's nonlinearities. However, this results in an optical signal with a large carrier (which contains no information) and a small modulated signal (which contains the data to be communicated). A larger optical signal to noise ratio is required to compensate for the large carrier.

As a final example, optical fibers have an inherently large bandwidth available for the transmission of data, but constructing transmitters and receivers which can take advantage of this large bandwidth can be problematic. First, current approaches, such as the on-off keying and time-division multiplexing of signals used in the SONET protocols, cannot be extended to higher speeds in a straightforward manner. This is because current electronics technology limits the speeds at which these approaches can be implemented and electronics fundamentally will not have sufficient bandwidth to fill the capacity of a fiber. Even if this were not a limitation, current modulation schemes such as on-off keying are not spectrally efficient; more data can be transmitted in less bandwidth by using more efficient modulation schemes.

Current optics technology also prevents the full utilization of a fiber's capacity. For example, in wavelength division multiplexing, signals are placed onto optical carriers of different wavelengths and all of these signals are transmitted across a common fiber. However, the components which combine and separate the different wavelength signals currently place a lower limit on the spacing between wavelengths, thus placing an upper limit on the number of wavelengths which may be used. This also leads to inefficient utilization of a fiber's bandwidth.

The ever-increasing demand for communications bandwidth further aggravates many of the problems mentioned above. In order to meet the increasing demand, it is desirable to increase the data rate of transmission across each fiber. However, this typically can only be achieved by either increasing the bandwidth being utilized and/or by increasing the spectral efficiency of the encoding scheme. Increasing the bandwidth, however, aggravates frequency-dependent effects, such as dispersion. Increasing the spectral efficiency increases the signal to noise requirements.

Thus, there is a need for optical communications systems which more fully utilize the available bandwidth of optical fibers. There is further a need to reduce or eliminate the deleterious effects caused by fiber dispersion, to reduce the power contained in the optical carrier, and to combat the many drawbacks mentioned above.

SUMMARY OF THE INVENTION

In accordance with the present invention, an optical communications system is for communicating information across an optical fiber and includes a transmitter subsystem. The transmitter subsystem includes at least two optical transmitters coupled to an optical combiner. Each optical transmitter generates an optical signal containing a subband of information. The optical signals have different polarizations, which preferably are orthogonal polarizations. The optical combiner optically combines the optical signals into a composite optical signal.

In another aspect of the invention, the transmitter subsystem includes an optical transmitter coupled to a polarization controlling device. The optical transmitter generates an optical signal containing at least two subbands of information. The polarization controlling device, for example a birefringent crystal, varies a polarization of the subbands so that the subbands have different polarizations.

The use of different polarizations yields many benefits. For example, subbands with different polarizations will interact less since they have different polarizations. Thus, unwanted effects due to phenomena such as four-wave mixing and cross-phase modulation will be reduced between the differently polarized subbands.

In another aspect of the invention, the transmitter subsystem includes two optical transmitters, an optical combiner, and an optical filter coupled in series. Each optical transmitter generates an optical signal containing both a lower optical sideband and an upper optical sideband (i.e., a double sideband optical signal). The optical combiner optically combines the two optical signals. The optical filter then selects the upper optical sideband of one optical signal and the lower optical sideband of the other optical signal to produce a composite optical signal. In one embodiment, the optical filter includes two Bragg filters coupled in series. In another aspect of the invention, the transmitter subsystem also includes a wavelength-locking device coupled to the optical transmitters for locking a frequency separation of the optical signals to a predetermined value. In general, one advantage of this approach is that the two optical sidebands (and, hence, also the subbands which they contain) can be more densely spaced in comparison to wavelength division multiplexing approaches, thus resulting in higher bandwidth utilization.

In a preferred embodiment, each optical transmitter includes at least two electrical transmitters, an FDM multiplexer and an E/O converter coupled in series. Each electrical transmitter generates electrical channels. The FDM multiplexer combines the electrical channels into an electrical high-speed channel using FDM. The electrical high-speed channel further includes a tone. The E/O converter converts the electrical high-speed channel into the optical signal for the optical transmitter. In one specific implementation, there are two optical transmitters. One generates an optical signal containing at least two subbands and a tone, each subband having a capacity of approximately 2.5 Gbps of information (i.e., same data capacity as an OC-48 signal). The other generates an orthogonally polarized optical signal containing at least two other 2.5 Gbps subbands and a tone. An optical filter selects the upper optical sideband of one optical signal and the lower sideband of the other optical signal. Thus, the total capacity for the transmitter subsystem is sixteen 2.5 Gbps subbands, or approximately 40 Gbps.

In another aspect of the invention, the optical communications system also includes a receiver subsystem coupled to the transmitter subsystem by an optical fiber. In a preferred embodiment for the case when the subbands within the composite optical signal have different polarizations, the receiver subsystem includes a polarizing splitter module coupled to a plurality of heterodyne receivers. The polarizing splitter module splits the composite optical signal according to polarization, for example into its constituent subbands. The heterodyne receivers then recover the subbands.

In further accordance with the invention, a method for transmitting information across an optical fiber includes the following steps. Two optical signals are generated. Each optical signal contains a subband of information, but the two optical signals have different polarizations. They are optically combined into a composite optical signal, which is transmitted across an optical fiber.

Another method according to the invention includes the following steps. An optical signal containing at least two subbands of information is generated. The polarizations of the subbands are varied so that the subbands have different polarizations. The optical signal is then transmitted across an optical fiber.

Yet another method according to the invention includes the following steps. Two optical signals are generated. Each optical signal contains a lower optical sideband and an upper optical sideband. The two optical signals are optically combined and then optically filtered. The filtering selects the lower optical sideband of one signal and the upper optical sideband of the other signal. The resulting composite optical signal is transmitted across an optical fiber.

BRIEF DESCRIPTION OF THE DRAWING

The invention has other advantages and features which will be more readily apparent from the following detailed description of the invention and the appended claims, when taken in conjunction with the accompanying drawing, in which:

FIGS. 13A-13E are graphs illustrating the spectra of various signals in system 1200;

FIGS. 15A-15D are graphs illustrating the spectra of various example composite signals;

FIG. 23 is a diagram showing the polarization of different subbands resulting from optical transmitter 2200;

FIGS. 24A-24D are graphs illustrating various other spectra according to the invention;

FIG. 26 is a graph illustrating the periodic pass bands of a comb filter; and

DETAILED DESCRIPTION OF THE PREFERRED EMBODIMENTS

Figure 1:
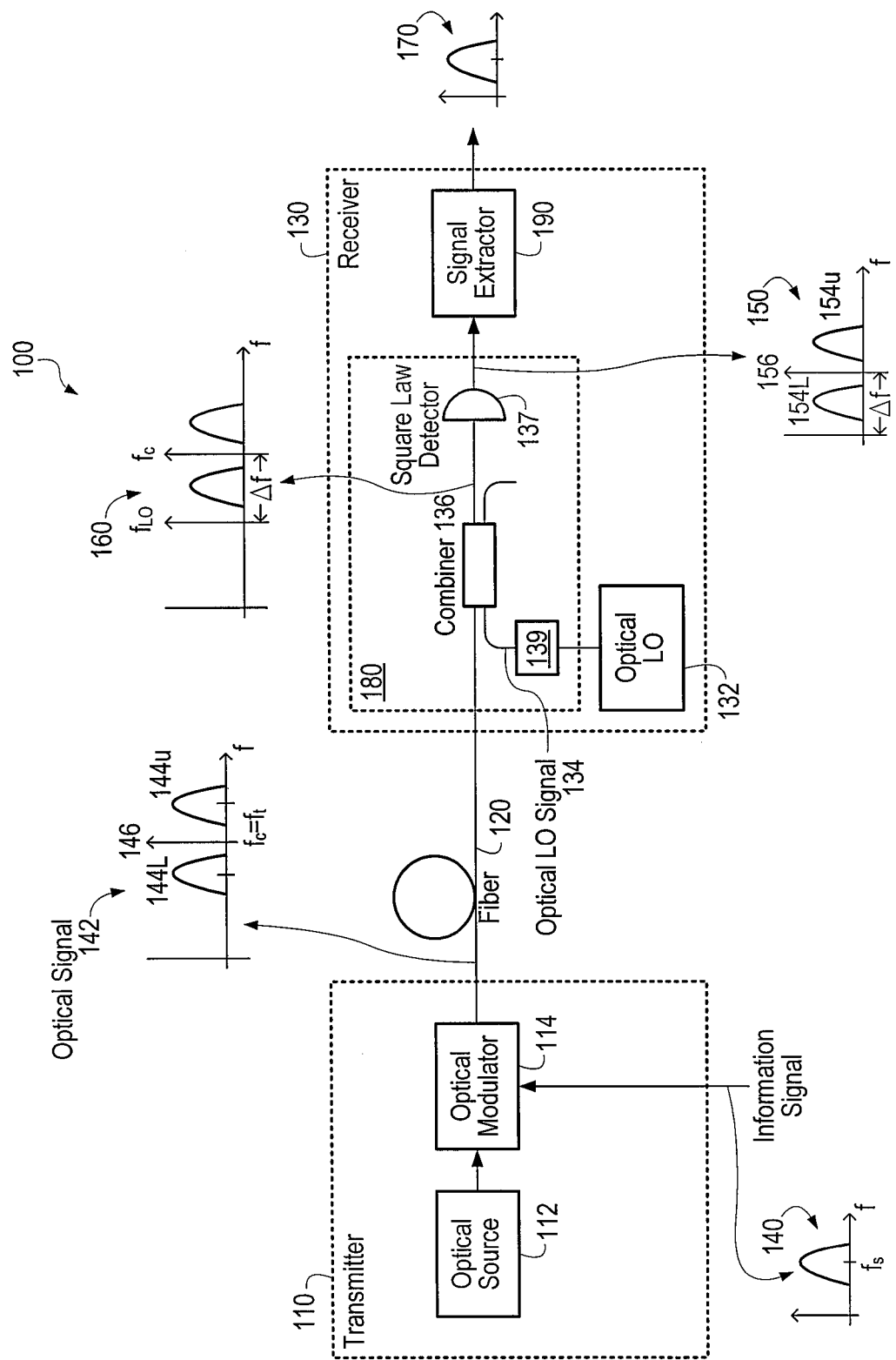
FIG. 1 is a block diagram of a system 100 illustrating one aspect of the present invention.

FIG. 1 is a diagram of a system 100 illustrating one aspect of the present invention. System 100 includes a transmitter 110 coupled to a receiver 130 by optical fiber 120. The receiver 130 preferably includes a heterodyne detector 180 coupled to a signal extractor 190. System 100 is used to transmit an information signal from transmitter 110 to receiver 130 via fiber 120.

Figure 2:
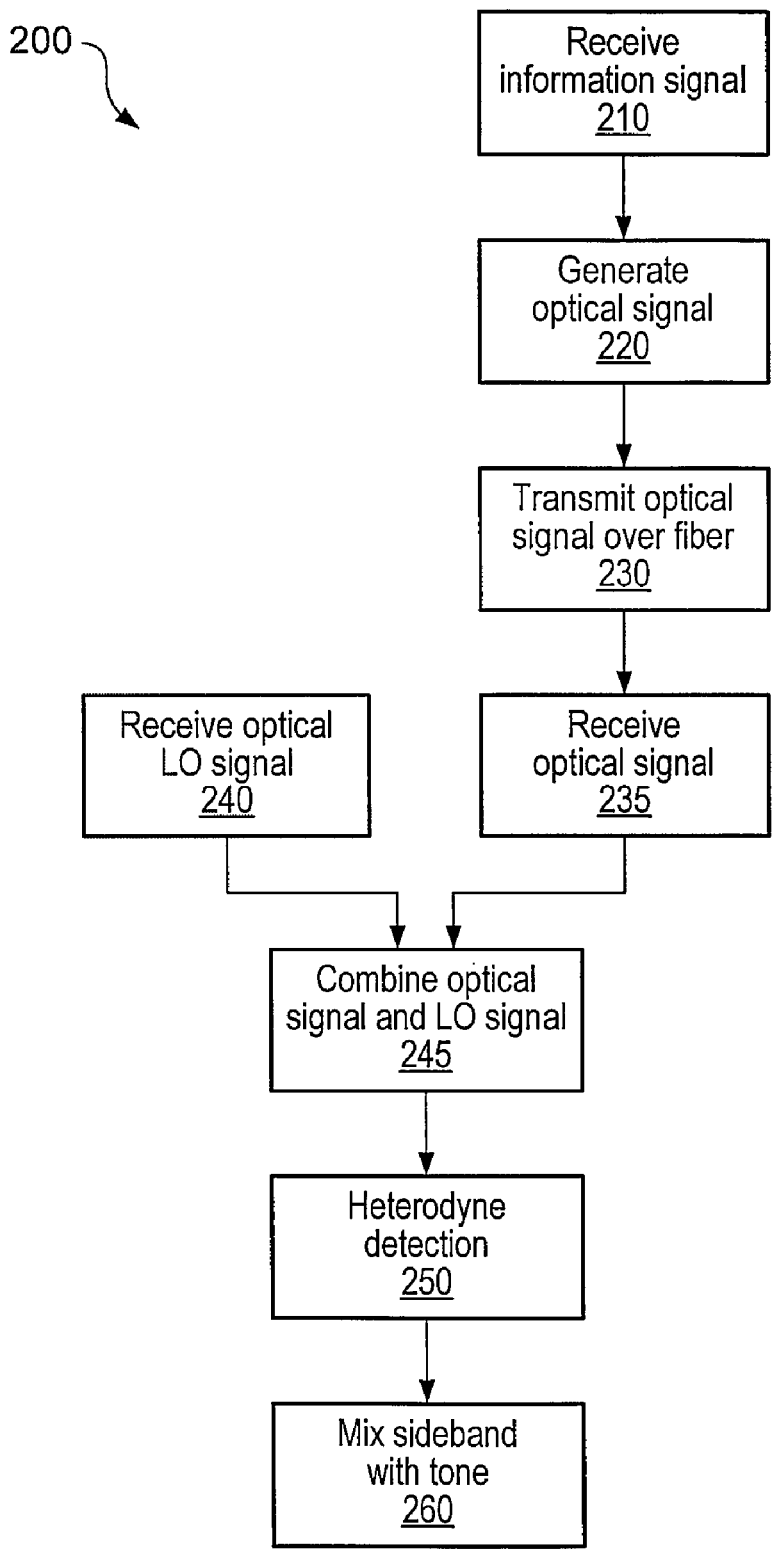
FIG. 2 is a flow diagram illustrating a method 200 for transmitting an information signal across a fiber using the system 100.

With reference to the flow diagram of FIG. 2 as well as to FIG. 1, system 100 operates as follows. The frequency spectrum of an example information signal is shown by spectrum 140, which is characterized by a frequency $f_S$. The frequency $f_S$ could be zero, for example, if the information signal is based on on-off keying. The information signal 140 may be any of a variety of signals. For example, it may be a single high speed data stream. Alternately, it may contain a number of data streams which are time-division multiplexed together, for example, if 64 OC-3 data streams are combined together to form a single OC-192 signal, which serves as the information signal 140. As another example, the information signal may include a number of constituent signals, each of which occupies a different frequency band within spectrum 140. In other words, the constituent signals may be frequency division multiplexed together. Other types of information signals 140 and methods for combining constituent signals to form the information signal 140 will be apparent.

Transmitter 110 receives 210 the information signal 140 and generates 220 an optical signal 142. Optical signal 142 is characterized by a carrier frequency $f_C$ and includes at least one sideband 144 based on the information signal 140 and at least one tone 146, shown at a frequency $f_t$ in the following examples. Various techniques may be used to achieve this function. In a preferred embodiment, transmitter 110 includes an optical source 112 coupled to an optical modulator 114. Examples of optical sources include solid state lasers and semiconductor lasers. Example optical modulators 114 include Mach Zehnder modulators, electro-optic modulators, and electro-absorptive modulators. The optical source 112 produces an optical carrier at the carrier frequency $f_C$. The modulator 114 receives 210 the information signal 140 and modulates the optical carrier with the information signal 140 to generate 220 optical signal 142. In the example of FIG. 1, double sideband modulation is illustrated, resulting in two sidebands (upper sideband 144U and lower sideband 144L) which are centered about the carrier frequency $f_C$. Other types of modulation, such as single sideband modulation, could also be used. Continuing this example, the modulator 114 also produces a significant signal at the carrier frequency $f_C$, which serves as a tone 146. Alternately, transmitter 110 may include an internally modulated laser. In this case, the information signal 140 drives the laser, the output of which is the optical signal 142.

The optical signal 142 is transmitted 230 over fiber 120 to receiver 130. Current optical fibers have two spectral regions which are commonly used for communications: the 1.3 and 1.55 micron regions. At a wavelength of 1.3 micron, transmission of the optical signal is primarily limited by attenuation in the fiber 120; dispersion is less of a factor. Conversely, at a wavelength of 1.55 micron, the optical signal will experience more dispersion but less attenuation. Hence, the optical signal preferably has a wavelength either in the 1.3 micron region or the 1.55 micron region and, for long distance communications systems, the 1.55 micron region is generally preferred.

At receiver 130, heterodyne detector 180 receives 235 the incoming optical signal 142 and also receives 240 an optical local oscillator signal 134 at a frequency $f_{Lo}$. In FIG. 1, the local oscillator signal 134 is shown at a frequency $f_{Lo}$ which is lower than the carrier frequency $f_c$ but the local oscillator signal 134 may also be located at a frequency $f_{Lo}$ which is higher than the carrier frequency $f_{LO}$. Examples of optical local oscillators 132 include solid state lasers and semiconductor lasers. The optical signal 142 and local oscillator signal 134 are combined 245 and heterodyne detection 250 of the combined signal effectively downshifts the optical signal 142 from a carrier at frequency $f_c$ to a frequency $\Delta f$, which is the difference between the local oscillator frequency $f_{LO}$ and the carrier frequency $f_c$. The resulting electrical signal has spectrum 150. Note that both sidebands 154L and 154U, and tone 156 have also been frequency downshifted compared to optical signal 142. Signal extractor 190 then mixes 260 at least one of the sidebands 154 with one of the tones 156 to produce a number of frequency components, including one frequency component 170 located at the difference frequency between the relevant sideband 154 and tone 156. This difference component 170 contains the information signal 140, although it may be offset in frequency from the original frequency $f_s$, depending on the frequencies of the sideband 154 and tone 156. Frequency components other than the difference component 170 may be used to recover the information signal. For example, the mixing 260 typically also produces a sum component located at the sum of the frequencies of the relevant sideband 154 and tone 156, and the information signal 140 may be recovered from this sum component rather than the difference component. If more than one sideband 154 is processed by signal extractor 190, each sideband 154 is processed separately from the others in a manner which prevents destructive interference between the sidebands.

However, recovering the information signal 140 based on the difference component of sideband 154 and tone 156 is advantageous because it results in noise cancellation. For example, sideband 154L and tone 156 are affected similarly by laser phase noise produced by optical source 112 and optical local oscillator 132. Using the difference component effectively subtracts the laser phase noise in sideband 154L from the laser phase noise in tone 156, resulting in significant cancellation of this noise source. In contrast, using the sum component would effectively reinforce the laser phase noise.

Processing the sidebands 154 separately from each other is also advantageous because it significantly reduces dispersion effects caused by fiber 120. For example, in direct detection receivers, upper and lower sidebands 154U and 154L would be processed together and, at certain frequencies for the sidebands 154 and lengths of fiber 120, the dispersion effects of fiber 120 would cause the two sidebands to destructively interfere, significantly impairing the recovery of information signal 140. By processing sidebands 154 separately from each other, signal extractor 190 avoids this deleterious dispersion effect.

In a preferred embodiment, heterodyne detector 180 includes a combiner 136 and a square law detector 137 coupled in series. Combiner 136 preferably is a fiber coupler, due to its low cost and applicability to fiber systems, although other types of combiners may be used. Square law detector 137 preferably is a PIN diode. Combiner 136 receives 235 the incoming optical signal 142 at one of its inputs and receives 240 the optical local oscillator signal 134 at the other input. Combiner 136 combines the local oscillator signal 134 with the optical signal 142 to produce the combined signal with spectrum 160. Heterodyne detector may also include a polarization controller 139 coupled to the combiner 136 for matching the polarizations of the optical signal 142 and the local oscillator signal 134 so that the two signals are mixed efficiently at the square law detector 137.

In a preferred embodiment, the polarization controller 139 matches the polarization of the local oscillator 134 to the polarization of the tone 146. This matching is particularly advantageous when a polarization tracking algorithm is used because the tone 146 is stable and does not have substantial amplitude variation and therefore provides better locking of the polarizations. In fibers having measurable polarization mode dispersion, after propagation through the fiber, each sideband 144 and the tone 146 can have slightly different polarizations, thus resulting in attenuation of the detected electrical signal due to the polarization mismatch. Generally, the further the separation in frequency between the sideband 144 and the tone 146, the stronger the attenuation of the detected electrical signal. This attenuation can be mitigated by boosting the transmit power of the affected subbands. For examples of methods for mitigating the attenuation of power in the subbands of the detected electrical signals, including boosting the transmit power of subbands, see co-pending U.S. patent application Ser. No. 09/854,153, "Channel Gain Control For An Optical Communications System Utilizing Frequency Division Multiplexing," by Laurence J. Newell and James F. Coward, filed May 11, 2001; and U.S. patent application Ser. No. 09/569,761, "Channel Gain Control For An Optical Communications System Utilizing Frequency Division Multiplexing," by Laurence J. Newell and James F. Coward, filed May 12, 2000 (now abandoned).

In FIG. 1, the polarization controller 139 is shown located between the local oscillator 132 and combiner 136 and controls the polarization of the local oscillator signal 134. Alternately, the polarization controller 139 may be located between the fiber 120 and combiner 136 and control the polarization of the optical signal 142. In another approach, polarization controller 139 may control the polarizations of both signals 134 and 142. Square law detector 137 produces a photocurrent which is proportional to the intensity of signal 160, which effectively mixes together the various frequency components in spectrum 160. The resulting electrical signal has a number of frequency components located at different frequencies, with the components of interest shown by spectrum 150. Spectrum 150 is similar to spectrum 142, but frequency downshifted from the carrier frequency $f_C$ to the difference frequency $\Delta f$.

Figure 3:
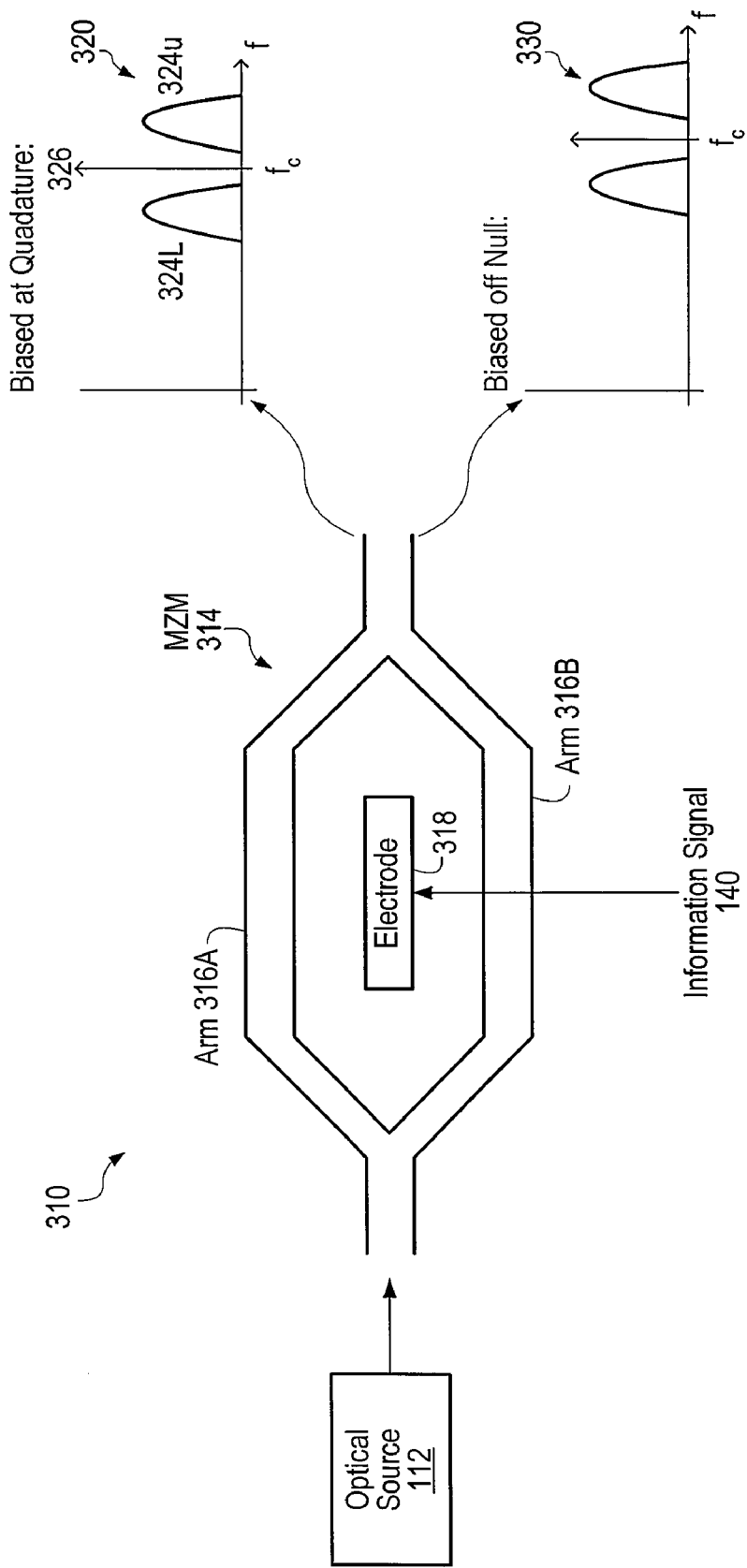
FIG. 3 is a diagram of one embodiment 310 of transmitter 110 using a Mach-Zender modulator.
Figure 4:
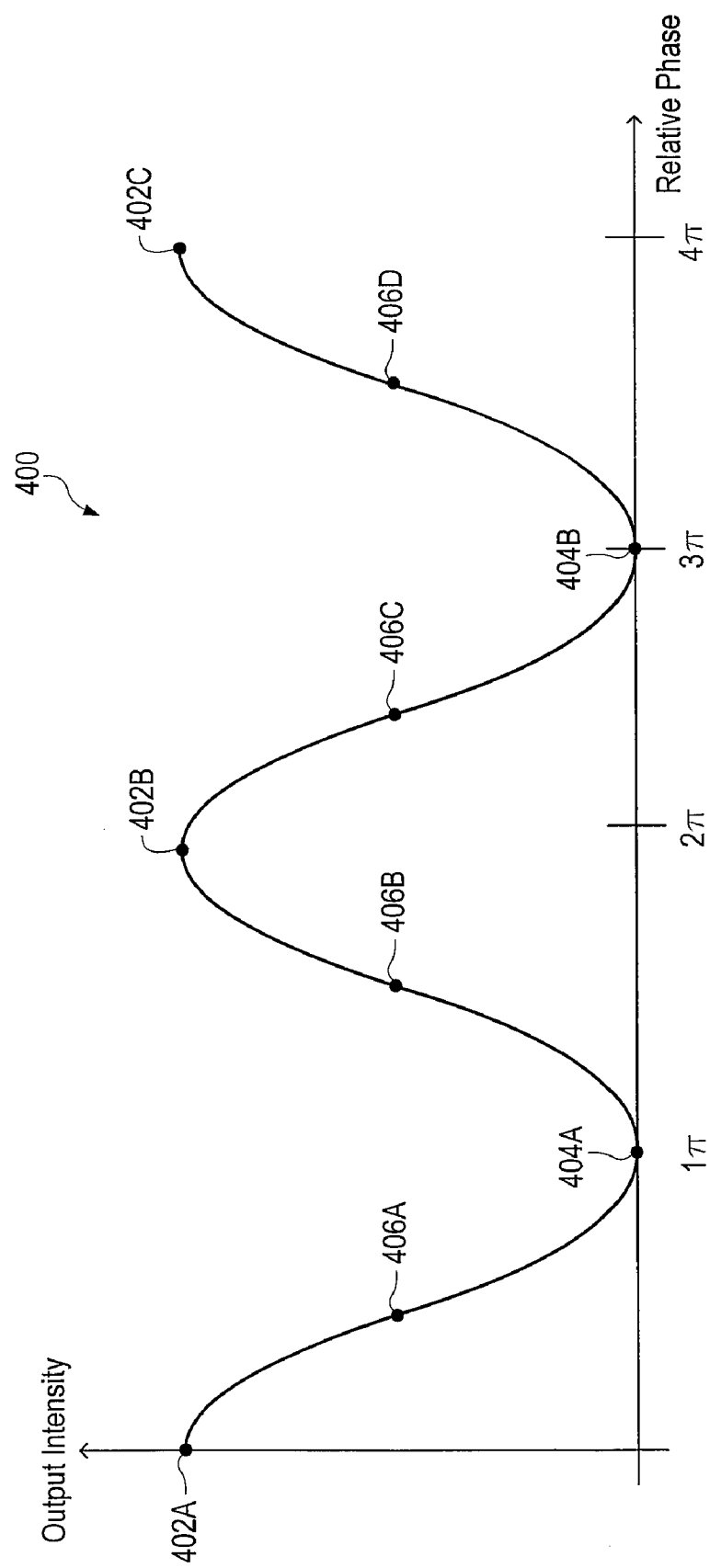
FIG. 4 is a graph illustrating a transfer function 400 for MZM 314.
Figure 5:
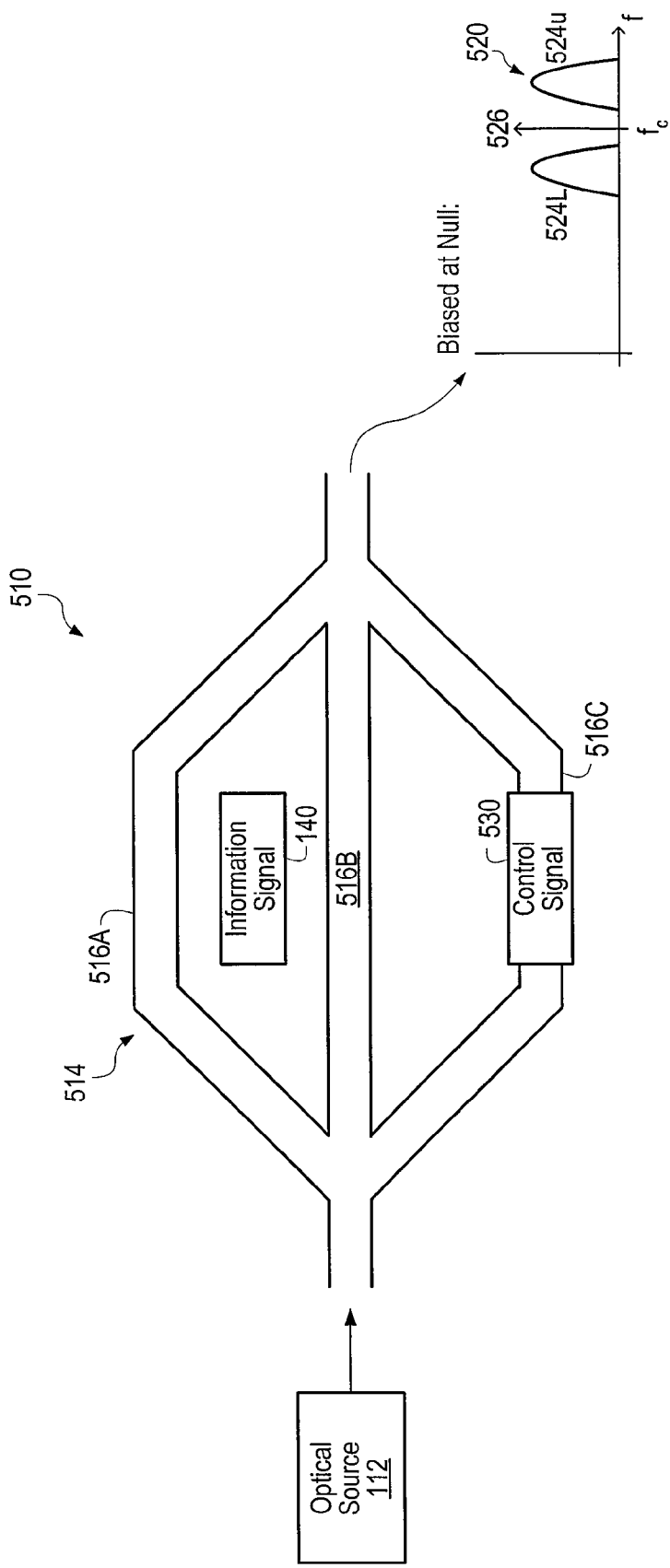
FIG. 5 is a diagram of another embodiment 510 of transmitter 110 using a three-armed modulator.

FIGS. 3-5 illustrate various embodiments of transmitter 110 and FIGS. 6-9 are examples of various embodiments of signal extractor 190. These embodiments are illustrated using the example of FIG. 1 in which optical signal 142 includes two sidebands 144 and the optical carrier functions as a tone 146. The invention, however, is not limited to this specific example. Modulation schemes besides double sideband may be used (e.g., single sideband). Similarly, the tone 146 may be located at frequencies other than the carrier frequency $f_c$ and/or multiple tones 146 may be used.

FIG. 3 is a diagram of one embodiment 310 of transmitter 110, in which modulator 114 includes a Mach-Zender modulator (MZM) 314. MZM 314 includes two arms 316A and 316B, and an electrode 318 for receiving information signal 140. The optical carrier produced by source 112 is received by MZM 314, which splits it into two signals, one propagating through each arm 316. The information signal 140 applied to electrode 318 produces an electric field across each of the arms 316, causing a difference in the optical path through each arm 316 (e.g., due to the electro-optic effect). As a result of this difference in optical path, the optical signals propagating through the two arms 316A and 316B will either constructively or destructively interfere when they are recombined at the output of the MZM 314. In other words, the output of MZM 314 depends on the relative phase difference between the two arms 316, which in turn depends on information signal 140.

FIG. 4 graphs the intensity of MZM 314 as a function of the relative phase shift between the two arms 316. Since MZM 314 is interferometric, the intensity of its optical output is a sinusoidal function of the relative phase shift between the two arms 316. For example, if the relative phase shift between the two arms 316 is a multiple of $2\pi$, then the signals in the two arms will constructively interfere, yielding a maximum intensity at the output as indicated by points 402A-402C. At the other extreme, two arms 316 which are out of phase will destructively interfere, yielding a minimum intensity at the output as shown by points 404A-404B, which shall be referred to as $V_\pi$ points. The interim cases result in the raised cosine transfer function 400 of FIG. 4. As described above, the relative phase shift is determined by the received information signal 140.

In one aspect of transmitter 310, the MZM 314 is biased at one of the quadrature points 406A-406D. At these quadrature points 406, the raised cosine transfer function may be used to approximates a linear transfer function, particularly if the modulator 314 is operated over a limited range around the quadrature points 406. When operated in this fashion, transmitter 310 results in the optical signal shown in spectrum 320. The raised cosine nature of transfer function 400 results in dual sidebands 324L and 324U; and operation at the quadrature point 406 results in a large signal at the carrier frequency $f_c$, which may be used as a tone 326.

FIG. 5 is a diagram of another embodiment 510 of transmitter 110, in which the optical modulator 114 includes a three-armed modulator 514. Modulator 514 includes three arms 516A-516C. Two arms 516A-516B form a conventional MZM and information signal 140 modulates the signal in these two arms in the same manner as MZM 314 of FIG. 3. However, the MZM formed by arms 516A-516B is not biased at one of the quadrature points 406. Rather, it is operated at one of the $V_\pi$ points 404. The result is an optical signal which includes two sidebands 524L and 524U but no optical carrier at $f_C$ since operation at the $V_\pi$ point 404 suppresses the carrier. The third arm 516C is used to reintroduce the optical carrier, preferably in a controlled manner by adjusting both the amplitude and phase of the carrier. For example, the amplitude and phase could be determined by adjusting the splitting ratios between the three arms 516 and/or the lengths of the arms 516, respectively. Alternatively, control signal 530 could be used to adjust elements in arm 516C which control the amplitude and phase of the carrier in the arm. This may be accomplished by using, for example, separate phase and amplitude modulation elements. The reintroduced carrier then functions as a tone 526 in optical signal 520. This approach is advantageous compared to transmitter 314 because the amplitude and phase of optical carrier 526 may be tailored for different purposes. For example, since optical carriers 526 and 326 do not carry any information, the amplitude of carrier 526 may be minimized to reduce wasted power whereas the amplitude of carrier 326 is fixed by quadrature point 406.

A similar result may be obtained by various other approaches. For example, the third arm 516C may be replaced by an optical fiber. Some of the optical carrier produced by source 112 is diverted to the optical fiber and then recombined with the output produced by the MZM formed by arms 516A-516B. In another approach, the MZM formed by arms 516A-516B may be biased at a point other than the $V_\pi$ point 404, thus producing an optical carrier. However, the phase and/or amplitude of the unmodulated carrier in arm 516C may be adjusted so that it interferes with the carrier produced by arms 516A-516B to generate an optical carrier with a desirable amplitude. The net result is an optical carrier of reduced amplitude. Alternately, referring again to FIG. 3, MZM 314 may be biased at a point close to but slightly offset from the $V_\pi$ points 404. The slight offset will result in some carrier being introduced into the optical signal, thus resulting in a spectrum 330 with a reduced optical carrier as in spectrum 520.

Figure 6:
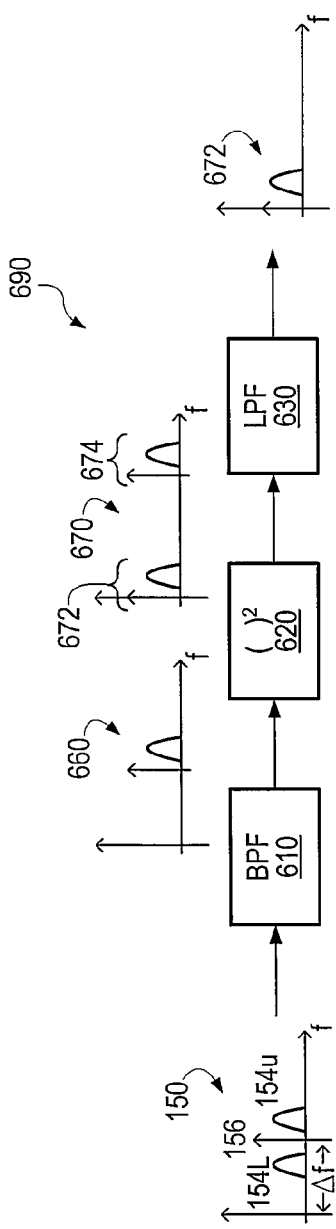
FIG. 6 is a block diagram of one embodiment 690 of signal extractor 190 based on squaring a signal containing a tone and a sideband.

FIG. 6 is a block diagram of one embodiment 690 of signal extractor 190 based on squaring a signal containing a tone and a sideband. Signal extractor 690 includes a bandpass filter 610, a square law device 620, and a low pass filter 630 coupled in series. The filters 610, 630 may be implemented in many different ways, for example, by a DSP chip or other logic device implementing a digital filter, a lump LC filter, a surface acoustic wave filter, a crystal-based filter, a cavity filter, or a dielectric filter. Other implementations will be apparent. The square law device 620 also may be implemented in many different ways. A diode is one common implementation.

Signal extractor 690 recovers the information signal 140 from electrical signal 150 as follows. Bandpass filter 610 frequency filters one of the sidebands and one of the tones from electrical signal 150. In this example, signal 150 includes two sidebands 154 and an optical carrier 156. Bandpass filter 610 passes the upper sideband 154U and the optical carrier 156, and blocks the lower sideband 154L, thus producing spectrum 660. The square law device 620 squares the filtered components 660, resulting in spectrum 670. Spectrum 670 includes frequency components 672 located at the difference of frequencies between sideband 154U and tone 156, and also frequency components 674 located at the sum of these frequencies. Low pass filter 630 selects the difference components 672, thus recovering the information signal 140.

As noted previously, selection of the difference components 672 rather than the sum components 674 is advantageous because it effectively cancels any noise sources which are common to both the tone 156 and sideband 154. In addition, processing a single sideband 154U, rather than both sidebands 154U and 154L together, prevents any potential destructive interference between the sidebands, as may be caused by the frequency dispersion effects discussed previously.

Figure 7:
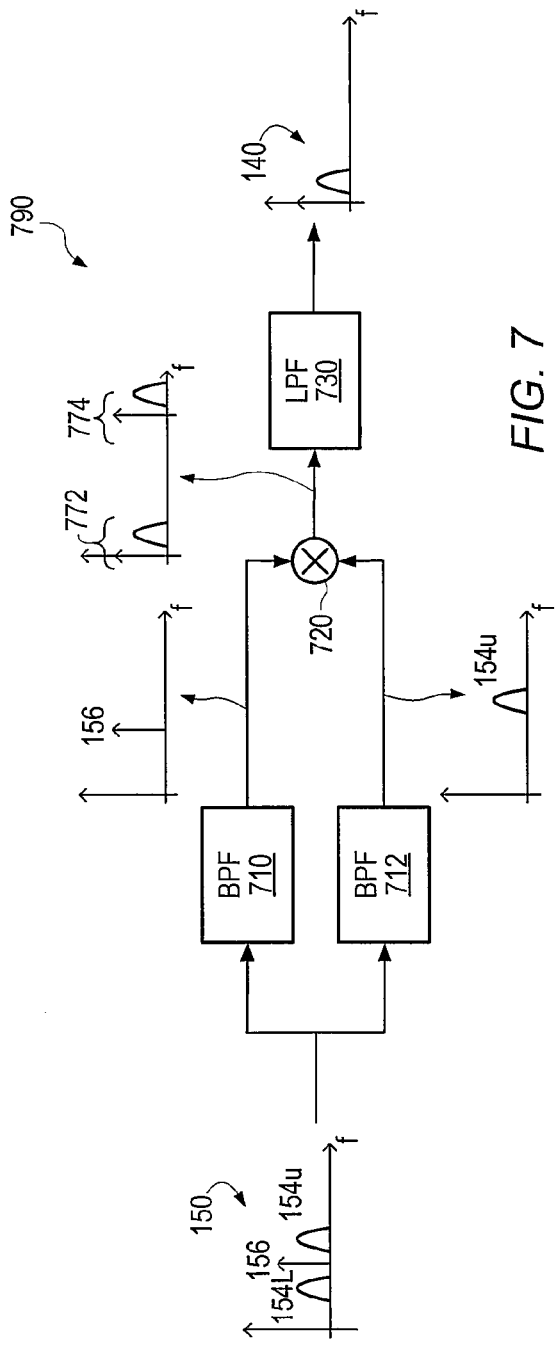
FIG. 7 is a block diagram of another embodiment 790 of signal extractor 190 based on multiplying a tone with a sideband.

FIG. 7 is a block diagram of another embodiment 790 of signal extractor 190 based on multiplying a tone with a sideband. This extractor 790 includes two bandpass filters 710 and 712, a multiplier 720 and a low pass filter 730. The two bandpass filters 710, 712 are each coupled to receive the incoming electrical signal 150 and are coupled on their outputs to multiplier 720. The multiplier is coupled to low pass filter 730.

Bandpass filter 710 selects a tone 156 and bandpass filter 712 selects one of the sidebands 154. In this specific example, the optical carrier and upper sideband 154U are the selected components. Multiplier 720 multiplies the tone 156 against the selected sideband 154U, resulting in a signal with a sum component 774 and a difference component 772, as in FIG. 6. Low pass filter 730 selects the difference component 772, thus recovering the information signal 140.

Figure 8:
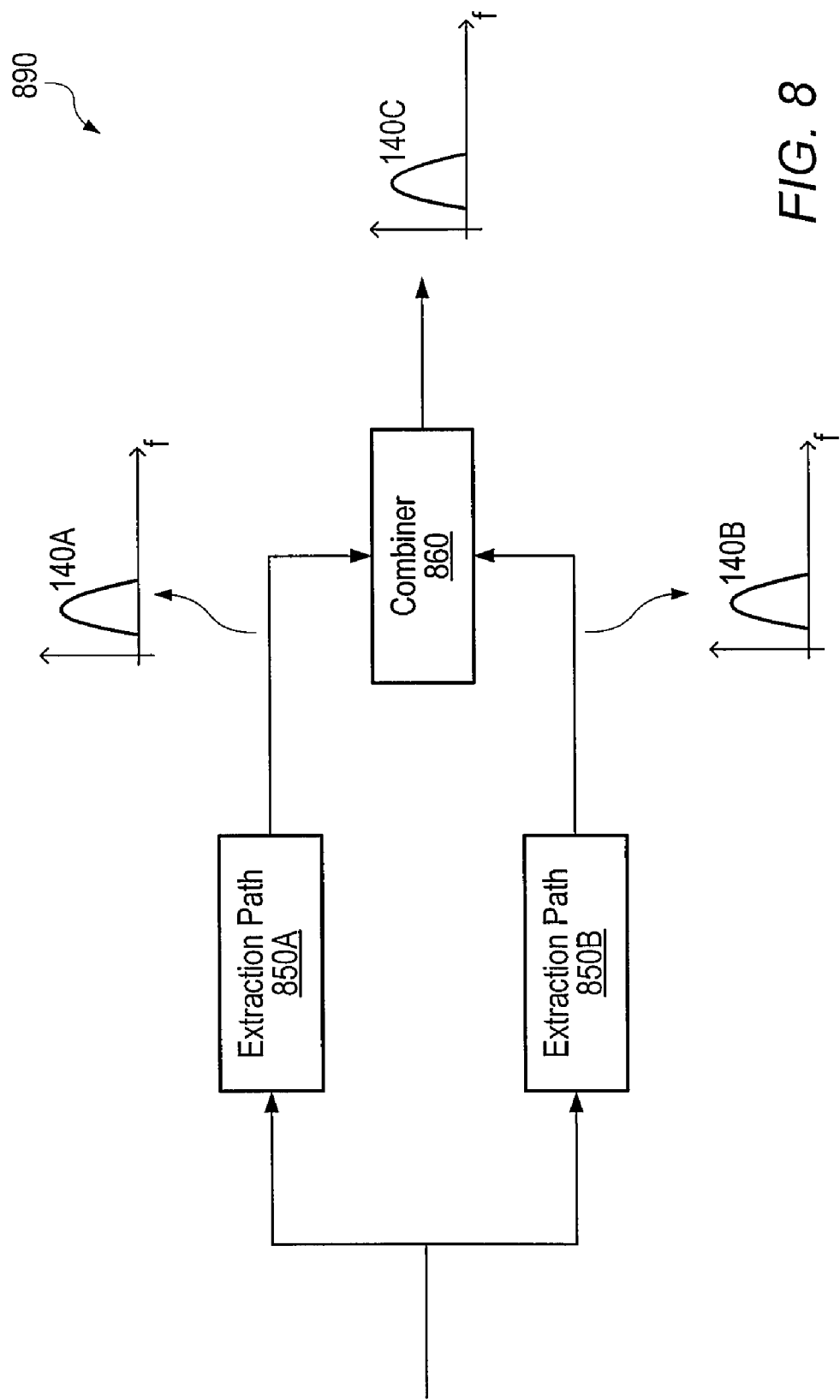
FIG. 8 is a block diagram of yet another embodiment 890 of signal extractor 190 using separate extraction paths to process different sidebands.

FIG. 8 is a block diagram of yet another embodiment 890 of signal extractor 190 using separate extraction paths for different sidebands. Example 890 includes two extraction paths 850A and 850B, and a combiner 860. Each extraction path 850 receives the incoming electrical signal 150 and is coupled on the output side to combiner 860.

Each extraction path 850 processes a different sideband within the electrical signal 150 to recover information signals 140A and 140B, respectively. As an example, extraction path 850A might process the upper sideband 154U; whereas extraction path 850B processes the lower sideband 154L. Both extraction paths 850 may use the same tone (e.g., the optical carrier) in their processing, or they may use different tones. Combiner 860 receives the recovered information signals 140A and 140B and constructively combines them to produce a resultant difference component 140C, which contains the original information signal. The difference components 140A and 140B typically may be phase shifted with respect to each other in order to align their phases before they are combined; the amount of the phase shift may be frequency-dependent. If difference components 140 are located at difference frequencies, combiner 860 may also frequency shift them to a common frequency before combining.

In a preferred embodiment, each path 850 is based on the approach of signal extractor 690 of FIG. 6, except that each extraction path 850 is designed to process a different sideband. Thus, for example, the bandpass filter 610 for extraction path 850A may be tuned to select the optical carrier and upper sideband 154U; whereas the bandpass filter 610 for extraction path 850B might select the optical carrier and lower sideband 154L. Alternately, each extraction path 850 may be based on the approach of signal extractor 790 of FIG. 7.

Figure 9:
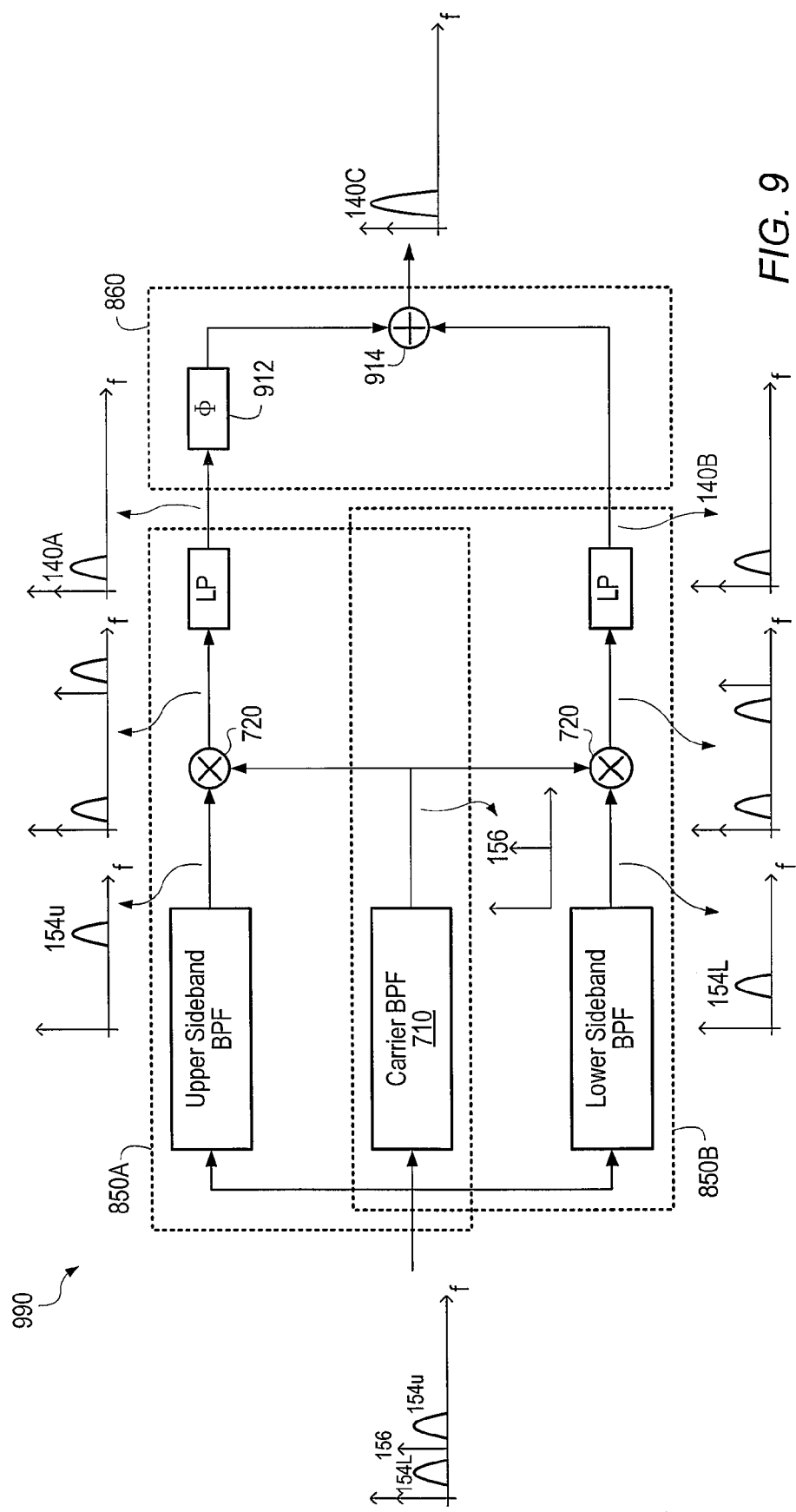
FIG. 9 is a block diagram of one embodiment 990 of signal extractor 890 based on multiplying a tone with a sideband.

FIG. 9 is a block diagram of one embodiment 990 of signal extractor 890 in which the extraction paths 850 share components, although the sidebands are still processed separately. In this embodiment, each of the extraction paths 850 is based on signal extractor 790. Extraction path 850A processes the upper sideband 154U; whereas extraction path 850B processes the lower sideband 154L. Both extraction paths use the optical carrier as the tone 526. Hence, they may share a common bandpass filter 710, which selects the optical carrier. In other words, the extraction paths are overlapping. The tone 526 is then fed to both multipliers 720 in each respective extraction path 850.

Combiner 860 includes a phase shifting element 912 and an adder 914. Phase shifting element 912 phase shifts the difference component 140A produced by extraction path 850A so that it is in phase with the difference component 140B produced by extraction path 850B. Adder 914 then adds the two in-phase components to produce the resulting difference component 140C.

Figure 10:
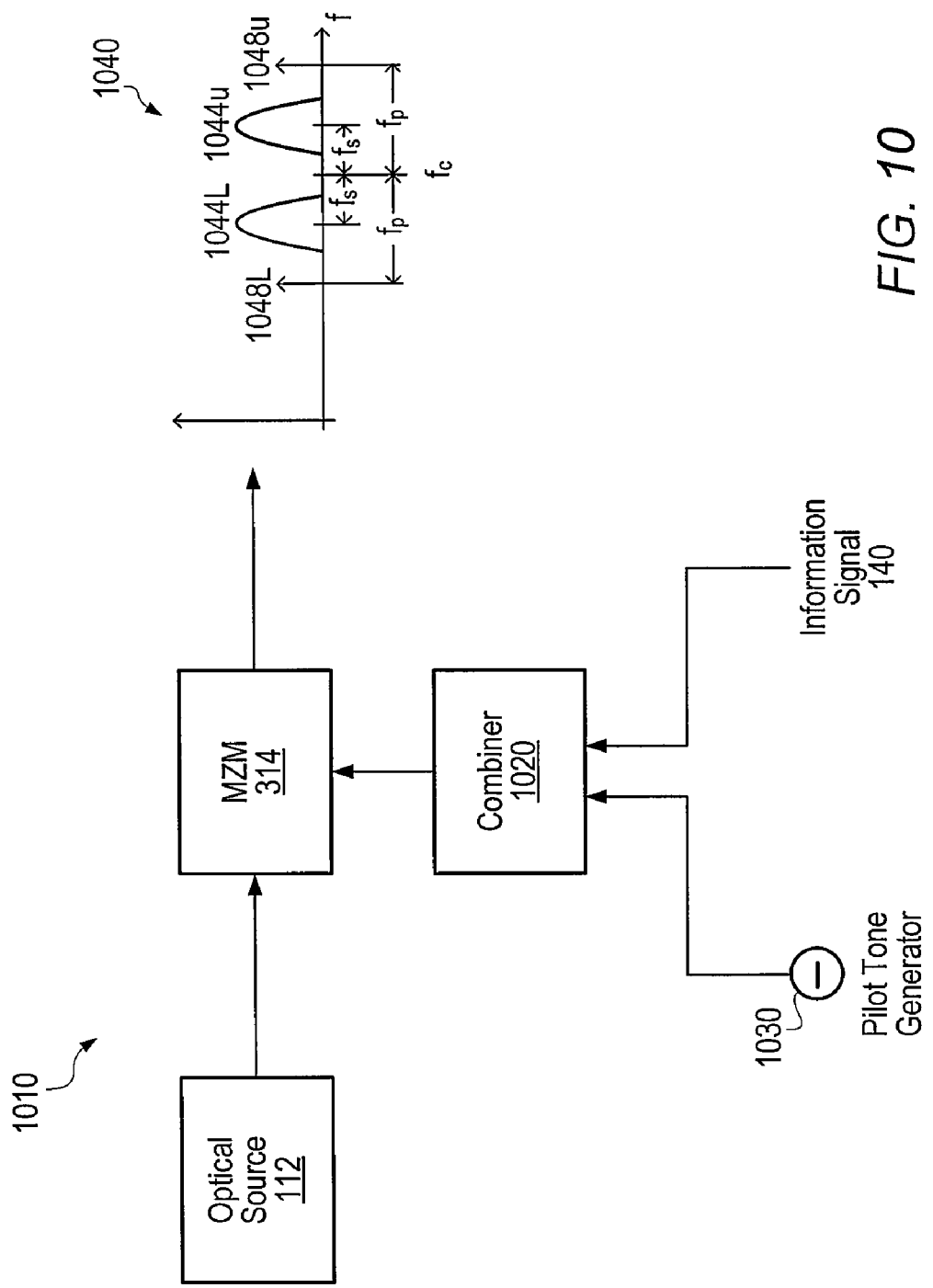
FIG. 10 is a diagram of another embodiment 1010 of transmitter 110 using pilot tones.

In FIGS. 3-9, the optical carrier played the function of the tone 146. FIG. 10 illustrates an example in which a tone 146 is located at a frequency other than the carrier frequency. In particular, FIG. 10 is a diagram of another embodiment 1010 of transmitter 100 using a pilot tone. Transmitter 1010 includes an optical source 112 coupled to an MZM 314 as in FIG. 3. However, transmitter 1010 also includes a combiner 1020 and a pilot tone generator 1030. The pilot tone generator 1030 is coupled to one input of combiner 1020, the output of which drives MZM 314. The other input of combiner 1020 receives information signal 140.

In transmitter 1010, combiner 1020 combines the pilot tone at a frequency $f_P$ with the incoming information signal 140 and uses the combined signal to modulate MZM 314. If MZM 314 is biased at the $V_\pi$ point, the resulting spectrum 1040 will include upper and lower sidebands 1044 of the information signal, upper and lower sidebands 1048 of the pilot tone, and no optical carrier. Each sideband 1048 of the pilot tone may be used by signal extractor 190 as a tone 146. In other words, the signal extractor may mix one of the pilot tones 1048 with one of the sidebands 1044 to recover the information signal 140.

All of the signal extractors 190 described above may be adapted for use with optical signal 1040. For example, referring to FIG. 6, bandpass filter 610 may be adjusted to select one of the sidebands 1044 and one of the pilot tones 1048. The square law device 620 would then produce a corresponding difference component 672. Since this difference component might not lie exactly at baseband, low pass filter 630 may also need to be adjusted in order to recover the correct frequency components. Similarly, referring to FIG. 7, extractor 790 may be adapted for use with signal 1040 by similarly adjusting the frequency bands for filters 710, 712, and 730 to select an appropriate sideband 1044, pilot tone 1048 and difference component 772, respectively. Similar adjustments may be made to the systems discussed in FIGS. 8 and 9. Transmitter 1010 and optical signal 1040 are merely illustrative, other combinations of tones and sidebands will be apparent.

Figure 11:
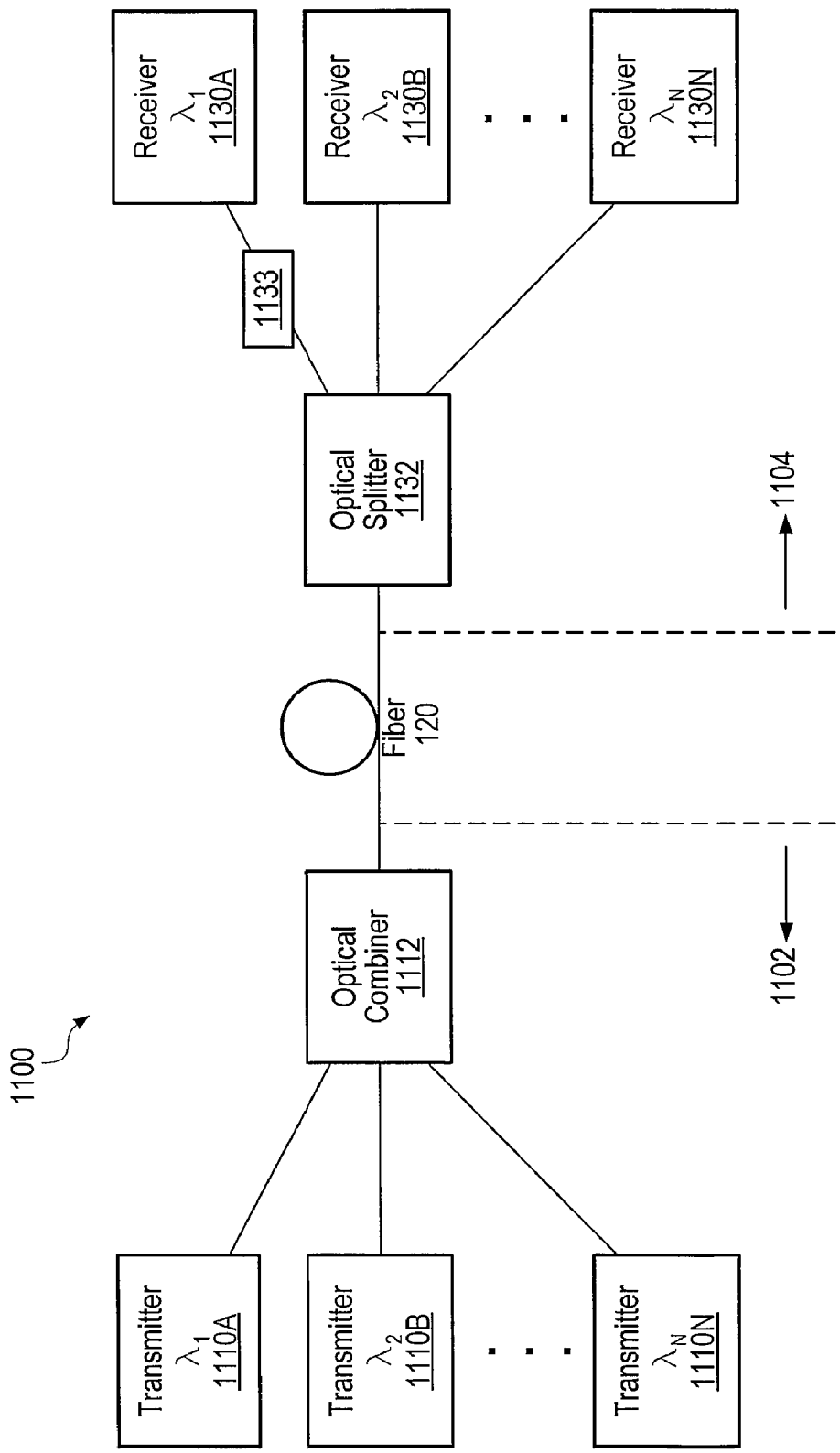
FIG. 11 is a block diagram of a system 1100 illustrating another aspect of the invention.
Figure 12:
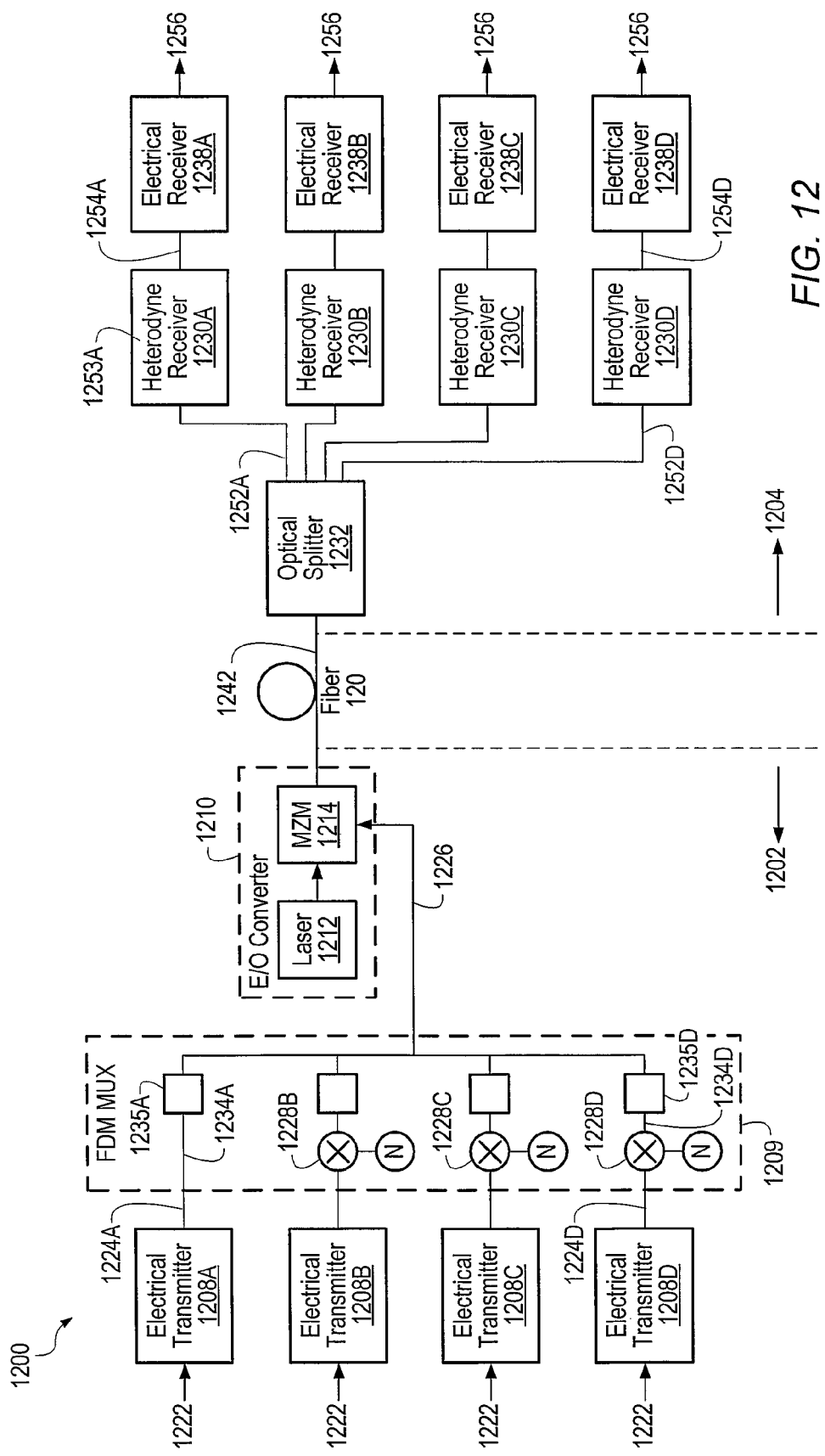
FIG. 12 is a block diagram of a system 1200 illustrating yet another aspect of the invention.

FIGS. 11 and 12 are block diagrams of systems 1100 and 1200 illustrating further aspects of the invention. Example system 100 used a single receiver 130 with a single optical local oscillator signal 134, in order to illustrate the basic principles of heterodyne detection and of processing sidebands separately. Systems 1100 and 1200 use multiple receivers, each using an optical local oscillator signal of a different frequency. As a result of these different frequencies, each receiver effectively is tuned to a specific wavelength band, thus automatically providing some wavelength selectivity. For clarity, in FIGS. 11 and 12, the term "heterodyne receiver" is used to describe receivers based on heterodyne detection, such as receiver 130 in FIG. 1 and its variants described in FIGS. 2-10.

In FIG. 11, system 1100 includes a transmitter subsystem 1102 coupled to a receiver subsystem 1104 via an optical fiber 120. Briefly stated, the transmitter subsystem 1102 encodes information to be transmitted onto an optical signal. For reasons which will become apparent below, this optical signal is referred to as a "composite optical signal." The composite optical signal is transmitted across the fiber 120 and received by the receiver subsystem 1104. The receiver subsystem 1104 recovers the original information from the composite optical signal.

Figure 14A:
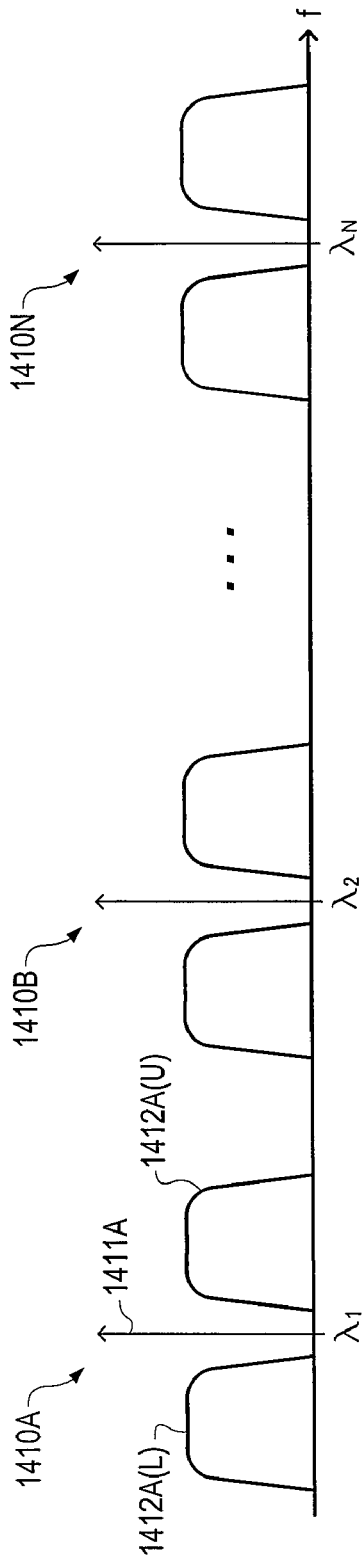
FIGS. 14A-14B are graphs illustrating the spectra of various signals in system 1100.
Figure 14B:
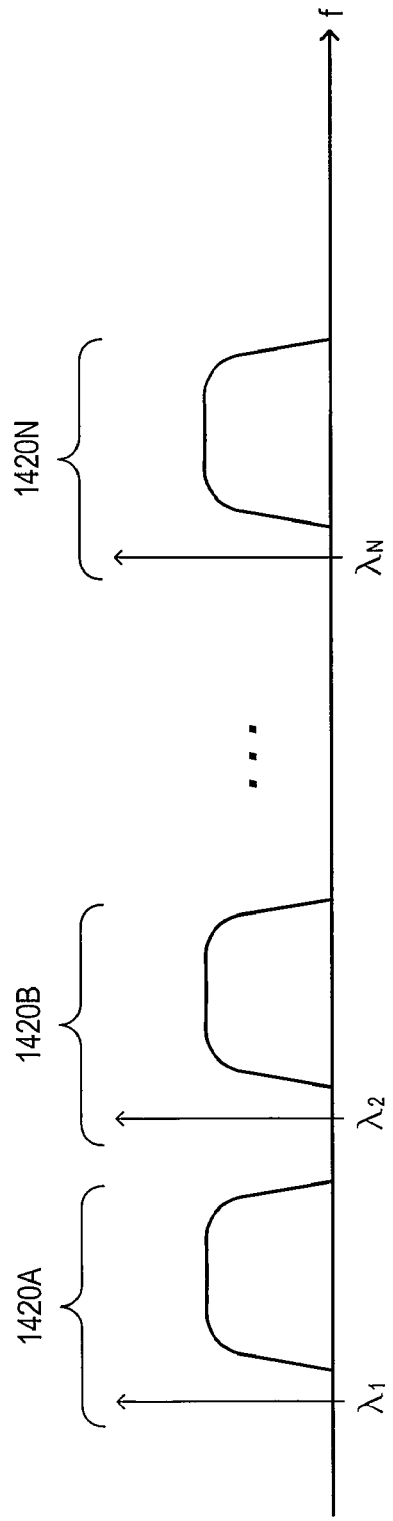

In more detail, the transmitter subsystem includes transmitters 1110A-1110N which are optically coupled to an optical combiner 1112. Transmitter 110 of FIG. 1 and its variants are suitable for use as a transmitter 1110. Each transmitter 1110 encodes information to be transmitted onto an optical signal which includes sideband(s) of information, as discussed previously in the context of FIG. 1, et seq. Each transmitter 1110 uses a different optical carrier frequency $\lambda_1$-$\lambda_N$ so as to spectrally separate the relevant sidebands of the various optical signals. Combiner 1112 optically combines the optical signals to produce the composite optical signal. Examples of combiners 1112 include 1:N power combiners (i.e., not wavelength selective) and WDM multiplexers. FIGS. 14A and 14B show spectra for two example composite optical signals. Referring first to FIG. 14A, transmitter 1110A produces double sideband signal 1410A. This signal includes optical carrier 1411A at wavelength $\lambda_1$ and an upper and lower sideband 1412A(U) and 1412A(L), respectively. Similarly, transmitters 1110B-1110N produce signals 1410B-1410N. For clarity, each of the sidebands 1412A-1412N will be referred to as subbands of the composite optical signal. The composite optical signal in FIG. 14B has a similar structure to that in FIG. 14A, except that the constituent optical signals 1420 are single sideband signals.

Thus, the composite optical signal includes at least two subbands of information, at least one from each of at least two transmitters 1110. The composite signal also includes at least one tone for use in the subsequent heterodyne recovery although it typically will contain more. As an example, if the optical carrier corresponding to each subband is used as the tone, then each transmitter will generate one tone and the composite optical signal will include a total of N tones. Each transmitter 1110 preferably generates the tone for the corresponding subbands.

On the receive side, the receiver subsystem 1104 includes an optical splitter 1132 coupled to heterodyne receivers 1130A-1130N. Ignore element 1133 for now. Again, receiver 130 of FIG. 1 and its variants are suitable for use as a receiver 1130. The optical splitter 1132 splits the composite optical signal into N optical signals, from which the encoded information is recovered. Each optical signal includes at least one subband and one tone, and each heterodyne receiver 1130 recovers the information from the subband using the heterodyne techniques described previously. More specifically, each heterodyne receiver 1130 uses an optical local oscillator at the appropriate frequency to select, if necessary, and process the appropriate subband and tone which it receives. In a preferred embodiment, there is a one-to-one correspondence between transmitters 1110 and receivers 1130. The optical local oscillator for receiver 1130A is selected to recover the subband produced by transmitter 1110A, which is located at an optical carrier frequency of $\lambda_1$. A similar relationship exists for the other transmitters 1110 and receivers 1130.

System 1100 implements an unconventional type of wavelength division multiplexing (WDM). Each of the optical signals generated by transmitters 1110 uses a different wavelength $\lambda_1$-$\lambda_N$. These different wavelength signals are combined and then transmitted over a single fiber 120. At the receiver subsystem 1104, they are then separated by wavelength and separately processed. However, as a result of the inherent spectral selectivity and increased sensitivity of heterodyne detection, system 1100 is different from conventional WDM systems in many respects. For example, in a conventional WDM system, the wavelength separation is implemented entirely by optical splitter 1132, which would be a WDM demultiplexer. In system 1100, however, the heterodyne receivers 1130 are also wavelength selective. Thus, the optical crosstalk suppression requirements of the optical splitter 1132 can be less stringent than those required for conventional WDM systems.

For example, in certain applications, a standard 1:N power splitter is appropriate for optical splitter 1132. Note that a conventional 1:N power splitter simply splits an incoming signal into N outgoing signals, each with 1/N the power of the original signal. Furthermore, unlike a WDM demultiplexer, a power splitter is not wavelength selective and, therefore, also is not selective between optical signals located at different wavelengths. Thus, for example, a power splitter does not suppress crosstalk between signals at different wavelengths. As a result of the large power loss, the lack of wavelength selectivity and the corresponding lack of crosstalk suppression, power splitters generally are not preferred for conventional WDM systems. In system 1100, however, the use of heterodyne detection overcomes both of these limitations. The increased sensitivity of heterodyne receivers compensates for the large power loss. The use of an optical local oscillator (and subsequent electrical filtering) to select the subband and tone of interest compensate for the lack of wavelength selectivity and crosstalk suppression. In fact, heterodyne receivers can be more wavelength sensitive than current WDM demultiplexers, thus allowing the optical carriers used by transmitters 1110 to be more closely spaced than in conventional WDM systems. As an intermediate solution, optical splitter 1132 may have some wavelength selectivity. For example, it may be a conventional 1:N power splitter followed by broad wavelength filters, so that the optical signals entering each heterodyne receiver 1130 are somewhat attenuated in the unwanted wavelength bands. Referring to FIG. 11, a wavelength filter tuned to wavelength $\lambda_1$ may be located at 1133 in order to filter the signal received by receiver 1130A. This increases the wavelength selectivity and also increases the optical signal to noise ratio since out of band noise is reduced. Alternately, optical splitter 1132 may be a WDM demultiplexer which has a spectral response too wide for use in conventional WDM systems but which offers some improvement over a spectrally flat power splitter.

Figure 13A:
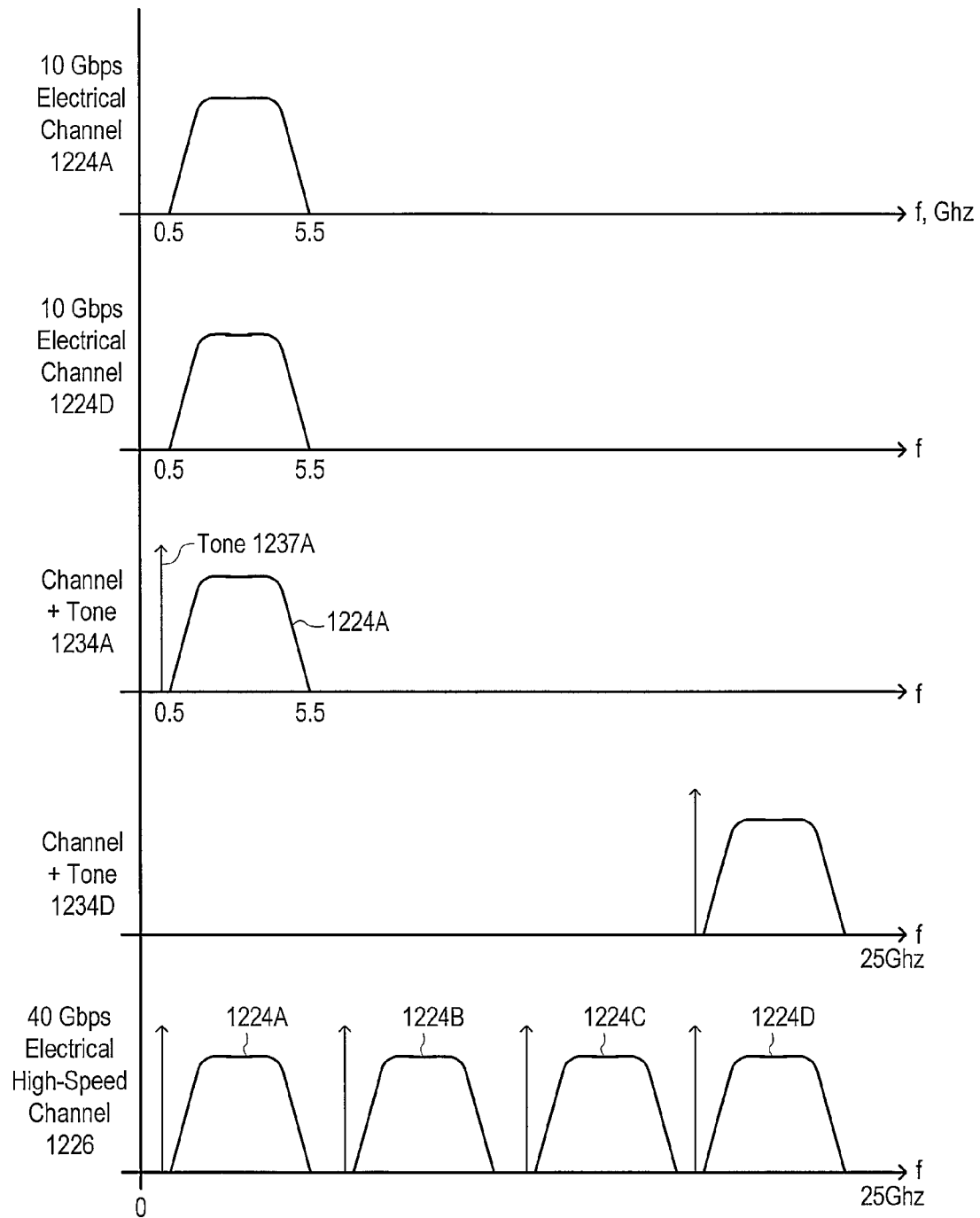

In FIG. 12, system 1200 is designed to transmit a composite optical signal of 40 billion bits per second (Gbps) of digital data across a single fiber. System 1200 includes a transmitter subsystem 1202 coupled to a receiver subsystem 1204 via an optical fiber 120. In system 1100 of FIG. 11, each transmitter 1110 received an electrical information signal and generated an optical signal with sidebands. The optical signals were then optically combined to produce the composite optical signal. In system 1200, the information signals and tones are electrically combined to produce an electrical high-speed channel, which is then converted to optical form to produce the composite optical signal. Approaches which use a mix of electrical and optical combining will be apparent. FIGS. 13A-13C illustrate the frequency spectra of various signals in system 1200. For clarity, only the relevant portions of these spectra are depicted in the figures.

In more detail, transmitter subsystem 1202 includes four electrical transmitters 1208A-1208D which are electrically coupled to an FDM multiplexer 1209, which in turn is coupled to transmitter 1210. Each electrical transmitter 1208 includes the same construction as element 245 in FIG. 6B of co-pending U.S. patent application Ser. No. 09/405,367, "Optical Communications Networks Utilizing Frequency Division Multiplexing," by Michael W. Rowan, et al., filed Sep. 24, 1999 (hereafter, the "FDM Application", now U.S. Pat. No. 6,529,303, issued Mar. 4, 2003). In brief, electrical transmitter 1208 includes a QAM modulator (included in element 640 of FIG. 6B) coupled to an FDM multiplexer (elements 642 and 644 in FIG. 6B). Each electrical transmitter 1208 receives 64 incoming electrical low-speed channels 1222, each of which has a data rate of 155 Mbps in this specific embodiment. The QAM modulator applies a QAM modulation to each incoming lowspeed channel. The FDM multiplexer combines the QAM-modulated low-speed channels using FDM techniques to form an electrical channel 1224A-1224D which has a data rate of 10 Gbps and a width of approximately 5.5 GHz. The frequency spectra of signals 1224A and 1224D are shown in FIG. 13A. See also FIG. 10D, et seq. in the FDM Application.

The FDM multiplexer 1209 combines the four 10 Gbps channels 1224 into a single electrical signal, which for convenience will be referred to as the electrical high-speed channel 1226. It does this using conventional FDM techniques, frequency shifting some or all of the 10 Gbps channels 1224 to higher carrier frequencies. For example, referring again to FIG. 13A, channel 1224A is not frequency shifted, as shown by spectra 1234A, but channel 1224D is frequency shifted up to the 25 GHz range, as shown by spectra 1234D. The embodiment shown in FIG. 12 uses a frequency mixer 1228D to frequency shift channel 1224D and also uses mixers 1228B and 1228C to frequency shift channels 1224B and 1224C, respectively. No frequency mixer is used for channel 1224A since it is not frequency shifted. Alternate embodiments may frequency shift some, none or all of the channels 1224 and devices other than frequency mixers may be used to achieve the frequency shifting. Tones 1237 are added after this frequency shifting. In the example of FIG. 13A, each tone 1237 is located at a slightly lower frequency than its corresponding channel 1224. In other embodiments, the tones may be located at other frequencies, including for example at frequencies higher than those of the corresponding channel. In other embodiments, the tones 1237 may also be added at different times during the signal processing and/or different channels may share a common tone. In addition, the electrical transmitters 1208 may include frequency shifters to move the spectral location of channels 1224, for example if they would otherwise overlap with the tones 1237. In this embodiment, the electrical high-speed channel 1226 has a total data rate of 40 Gbps and a spectral width of approximately 25 GHz, as shown in FIG. 13A. In the embodiment shown in FIG. 12, the FDM multiplexer 1209 also includes filters 1235, which filter out unwanted frequency components.

Transmitter 1210 is an E/O converter, which in this embodiment includes a laser 1212 and a Mach-Zender modulator 1214. The laser 1212 generates an optical carrier at a frequency $f_c$ and the MZM 1214 modulates the optical carrier with the 40 Gbps electrical high-speed channel 1226. As described previously, the MZM may be operated at a number of different bias points. In this embodiment, it is biased at a point at or close to the $V_\pi$ points 404 of FIG. 4. In some applications, it is preferable to bias the MZM at the $V_\pi$ point. For example, if separate pilot tones are used, reducing or eliminating the optical carrier will save power. In theory, biasing at the $V_\pi$ point should eliminate the optical carrier but practical constraints usually result in a reduced but non-zero optical carrier. The result is a composite optical signal 1242 with double sideband modulation and a reduced optical carrier, as shown in FIG. 13B. Note that the composite optical signal 1242 has two optical sidebands 1243U and 1243L, each including four separate subbands 1224A-1224D. As mentioned previously, although this example is based on a double sideband optical signal 1242, single sideband signals may also be used. For example, in one embodiment, the lower sideband 1243L of composite signal 1242 is eliminated, for example by optical filtering. The resulting composite signal would occupy half the spectral bandwidth.

On the receive side, the receiver subsystem 1204 includes an optical splitter 1232 which is optically coupled to four heterodyne receivers 1230A-1230D, each of which is coupled to an electrical receiver 1238. The splitter 1232 splits the received composite signal 1242 into four optical signals 1252A-1252D, one for each heterodyne receiver 1230. Accordingly, each optical signal includes a primary subband 1224 of interest plus corresponding tone 1237. In this embodiment, the optical splitter 1232 is a power splitter with wavelength filters, as described previously. In an alternate embodiment, the optical splitter 1232 includes separate splitters, each of which splits off one of the optical signals 1252 from the composite signal 1242.

FIG. 13C shows the spectrum for signal 1252A, as an example. The primary subband 1271A(U) and tone 1272A(U) for optical signal 1252A is located in the spectral region located 0-5.5 GHz above the optical carrier. The primary subband 1271A(U) and tone 1272A(U) in FIG. 13C correspond to subband 1224A(U) and tone 1237A(U) in FIG. 13B. The other subbands (subbands 1271A(L) and 1271B(U) are shown in FIG. 13C) are attenuated by the wavelength filters, which have spectral response shown by the dashed line 1273A. FIG. 13C also shows the frequency spectrum for optical signal 1252D with primary subband 1271D(U) and tone 1272D(U), which correspond to subband 1224D(U) and tone 1237D(U) in FIG. 13B. Again, the dashed line 1273D shows the spectral response of the corresponding wavelength filter.

In the embodiment shown, the heterodyne receivers 1230 recover the original electrical signals 1254 from the incoming optical signals 1252. Continuing the trace of signals through receiver 1230A, receiver 1230A uses an optical local oscillator which is located at a frequency which is 11.5 GHz removed from the optical carrier frequency.

Figure 13D:
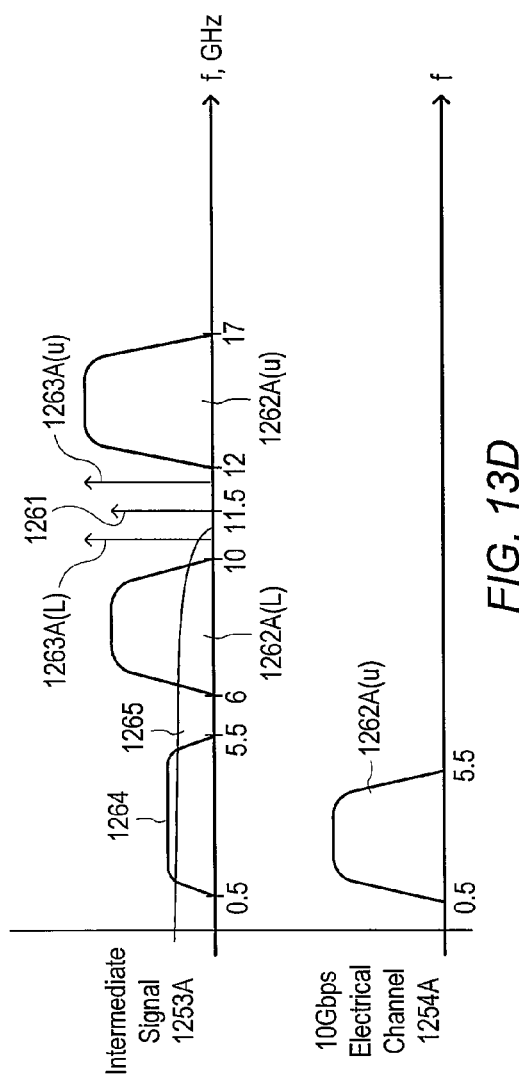

Spectrum 1253A of FIG. 13D shows the relevant portions of the signal after the optical local oscillator has been combined with the incoming optical signal 1252A and then detected by the square law detector. The spectrum 1253A includes several frequency components 1261-1265. Frequency components 1261, 1262A and 1263A are the frequency-offset versions of the optical carrier, subbands 1271A and tones 1272A, respectively.

Using a square law detector, frequency components 1264 and 1265 result from the direct detection of the received signal. For convenience, these components 1264 and 1265 shall be referred to as direct detection components. In particular, frequency component 1264 generally includes the direct detection cross-products of the subband of interest and tones which are located close in frequency, for example the cross-product of subband 1271A(U) with tone 1272A(U). Frequency component 1264 may also include the direct detection cross-products of other subbands and tones if they have not been significantly filtered, for example the cross-product of subband 1271B(U) with tone 1272B(U). Frequency component 1265 generally includes the direct detection square-products of the subband of interest, for example the square product of 1271A(U) in this example. It may also include direct detection cross-products of subbands with each other, for example the cross-product of subband 1271A(U) with 1271A(L).

Note that frequency components 1264 and 1265 typically represent the most significant unwanted frequency components, but not the only unwanted frequency components. For example, cross-products of tones and carriers are not shown in FIG. 13D. Neither are all of the possible cross-products which theoretically could be generated from the square law detection. Although not shown in FIG. 13D, all of these frequency components are accounted for in the overall design, typically either by ensuring that they fall outside the frequency band of interest or by sufficiently attenuating them (or the frequency components which give rise to them) so that they are negligible.

Spectrum 1253A illustrates an embodiment in which the local oscillator is selected so that the direct detection components 1264 and 1265 do not overlap with the primary subband 1262A(U). In the example given here, the frequency offset is 11.5 GHz, but any suitable offset may be chosen. In an alternate embodiment, the direct detection components 1264 and/or 1265 may overlap with the primary subband 1262A(U) so long as the resulting crosstalk is tolerable.

The subband 1262A(U) is frequency filtered and frequency down-shifted to approximately the 0-5.5 GHz spectral location by using component 1263A(U) as the tone in the signal extractor, yielding the electrical signal 1254A, as shown in FIG. 13D. The frequency filtering also reduces the noise which results from the local oscillator beating with optical noise in the signal.

Figure 13E:
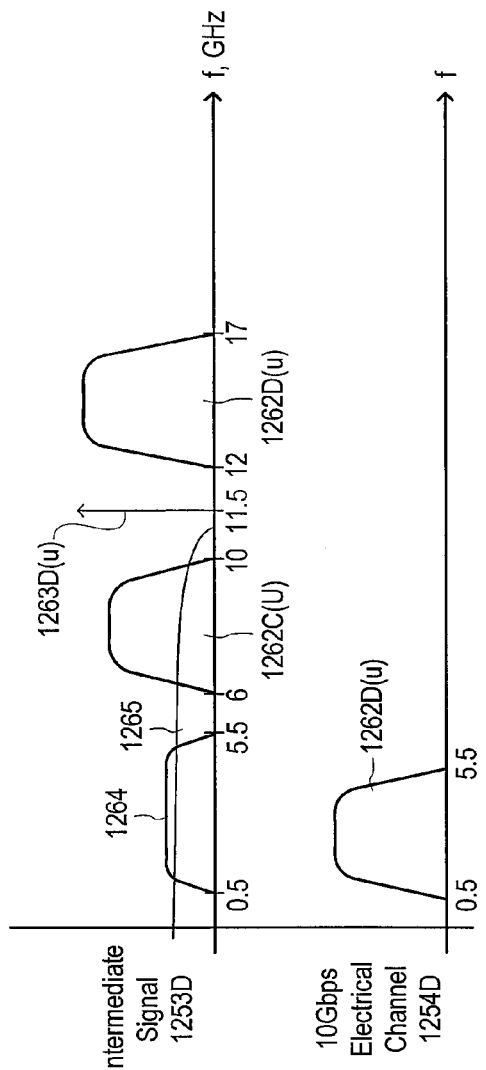

Optical signal 1252D is similarly processed, as shown in FIG. 13E. More specifically, the local oscillator for heterodyne receiver 1230D is selected to be 11.5 GHz offset from tone 1272D(U). Spectrum 1253D of FIG. 13E shows the signal after this optical local oscillator has been combined with the incoming optical signal 1252D and then detected by the square law detector. Frequency components 1263D(U), 1262D(U) and 1262C(U) are the frequency-offset versions of the tone 1272D(U), the primary subband 1271D(U) and other subband 1271C(U), respectively. Frequency components 1264 and 1265 are direct detection components. The subband 1262D(U) is frequency filtered and frequency down-shifted to the 0-5.5 GHz spectral location, yielding the electrical signal 1254D, as shown in FIG. 13E.

Note that since receiver subsystem 1204 splits the composite signal 1242 into four signals, each of which is processed by a different heterodyne receiver 1230, each heterodyne receiver can have a narrower spectral response than if the entire composite signal were processed by a single receiver. In this case, each heterodyne receiver 1230 recovers a signal of approximately 5 GHz spectral width and requires a similar spectral operating range; whereas the composite signal has a sideband width of approximately 25 GHz.

Electrical receiver 1238 reverses the functionality of electrical transmitter 1208, separating the incoming 5.5 GHz electrical signal 1254 into its 64 constituent 150 Mbps low-speed channels 1256. Accordingly, each receiver 1238 includes the same construction as element 240 in FIG. 6A of the FDM Application. An FDM demultiplexer (elements 624 and 622 in FIG. 6A) frequency demultiplexes the 5.5 GHz electrical signal 1254 into 64 separate electrical channels, each of which is then QAM demodulated by a QAM demodulator (included in element 620 in FIG. 6A).

System 1200, like the other systems described, is an example. The invention is not limited to the specific numbers of transmitters and/or receivers, frequency ranges, data rates, etc. Other variations will be apparent. For example, a 40 Gbps transmitter subsystem 1202 operating at a first wavelength $\lambda_1$ could be used as the transmitter 1100A in system 1100, a second transmitter subsystem 1202 operating at wavelength $\lambda_2$ as transmitter 1100B, and so on, with corresponding changes on the receive side. In this way, systems 1100 and 1200 can be combined to yield an even higher data rate system.

Figure 15A:
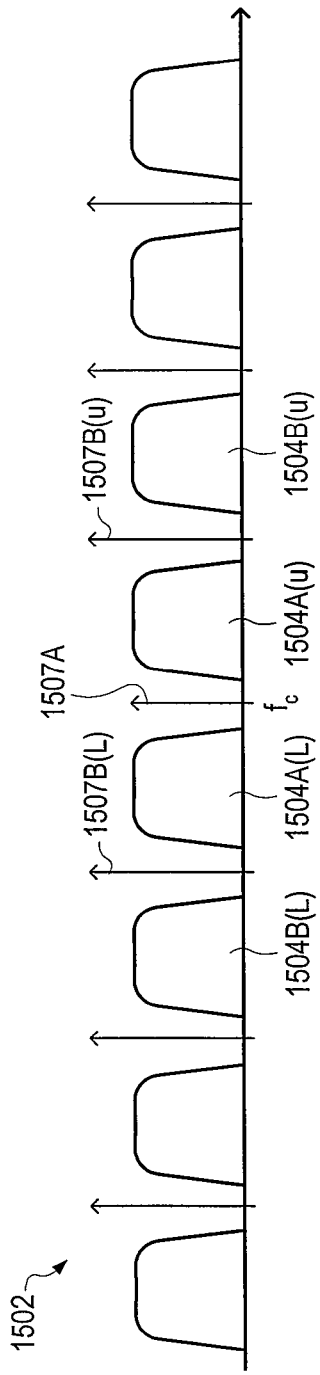
Figure 15B:
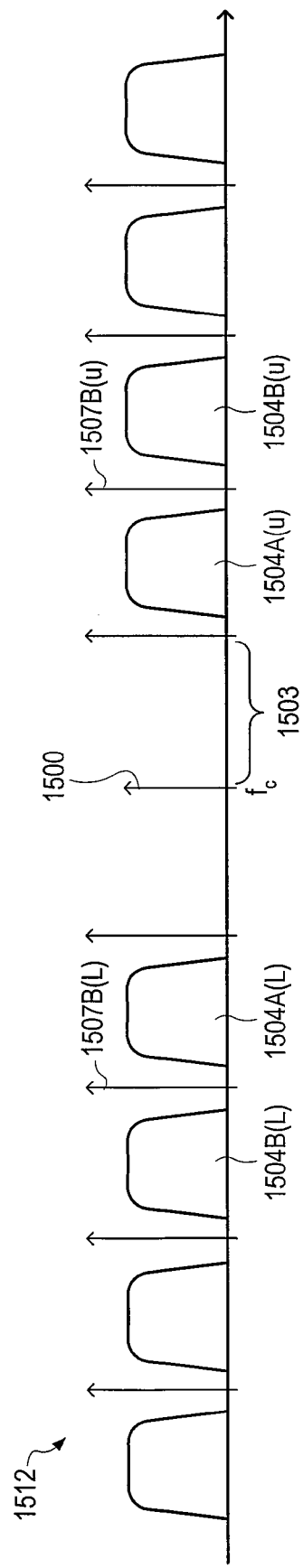

As another example, FIG. 13B illustrates one example composite signal 1242 in which each subband 1224 has a corresponding tone 1237 and the tones 1237 are located between the optical carrier and the corresponding subband 1224. FIGS. 15A-15D illustrate other types of composite optical signals. In FIG. 15A, the composite signal 1502 is similar to composite signal 1242 of FIG. 13B with one difference. The tone 1507A for the innermost subbands 1504A is located at the same frequency as the optical carrier rather than at a separate frequency, as is the case with tones 1237A in FIG. 13B. In FIG. 15B, the composite signal 1512 is similar to composite signal 1242 except that there is a wide spectral separation 1503 between the subbands 1514 and optical carrier 1500. In FIG. 15C, each subband 1534 is located between the optical carrier 1500 and the corresponding tone 1537, instead of vice versa as in FIG. 13B. As a final example, in FIG. 15D, the tones 1547 are shared by subbands 1544. For example, tone 1547A(U) corresponds to both subband 1544A(U) and subband 1544B(U). Other variations will be apparent.

Figure 16:
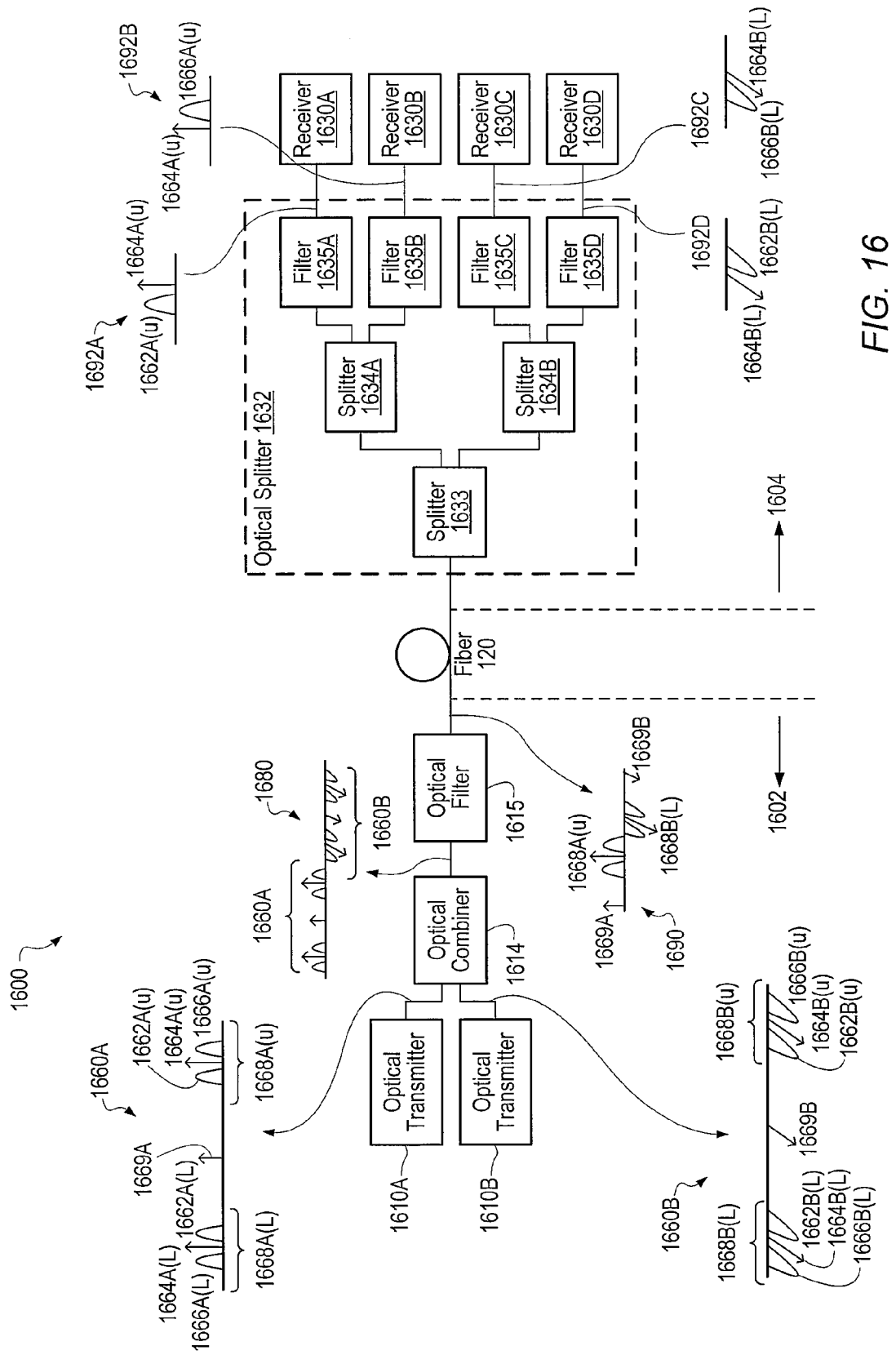
FIG. 16 is a block diagram of a system 1600 illustrating yet another aspect of the invention.

FIG. 16 is a block diagram of a system 1600 illustrating yet another aspect of the invention. System 1600 includes a transmitter subsystem 1602 coupled to a receiver subsystem 1604 via an optical fiber 120. The transmitter subsystem 1602 includes two optical transmitters 1610A and 1610B, an optical combiner 1614, and an optical filter 1615. Each of the optical transmitters 1610 is coupled to the optical combiner 1614, which in turn is coupled to the optical filter 1615.

System 1600 operates as follows. Each optical transmitter 1610 produces an optical signal 1660A or 1660B, respectively, which eventually is transmitted down the fiber as an optical single sideband signal. Each optical signal 1660 includes one or more subband(s) and tone(s) for eventual heterodyne detection. In this particular example, optical signal 1660A is a double-sideband signal having an upper optical sideband 1668A(U), a lower optical sideband 1668A(L), and a suppressed carrier 1669A. In an alternate embodiment, the carrier 1669A may not be suppressed in the optical transmitter 1610, but suppressed later, for example by optical filter 1615. Upper sideband 1668A(U) includes subbands 1662A(U) and 1666A(U), and tone 1664A(U). Lower sideband 1668A(L) includes the mirror image: subbands 1662A(L) and 1666A(L), and tone 1664A(L). Note that in this example, the subbands 1662A and 1666A are not upper and lower sidebands resulting from an electrical double sideband modulation in which signal 1664A is an electrical carrier. Rather, each subband 1662A and 1666A carries different information and signal 1664A is a tone.

Optical signal 1660B is similarly structured, containing two optical sidebands 1668B and a suppressed carrier 1669B. Each optical sideband 1668B includes two subbands 1662B and 1666B, and a tone 1664B. The subbands 1662B and 1666B are different from the subbands 1662A and 1666A; so in this example, there are a total of four subbands carrying different information. Optical signals 1660A and 1660B are also different in that they are orthogonally polarized. In one embodiment, they have crossed linear polarizations. In FIG. 16, the orthogonal polarizations are indicated by the orientation of the spectra. For example, spectra 1660A is oriented in the plane of the paper, indicating one polarization; while spectra 1660B is oriented coming out of the paper, indicating an orthogonal polarization. In addition, the two optical signals 1660 use optical carriers 1669 of different wavelengths. In an alternate embodiment, the optical signals 1660 are orthogonally polarized but not using crossed linear polarizations. For example, one signal 1660A may be right circularly polarized; whereas the other signal 1660B is left circularly polarized. In another embodiment, the two optical signals have different polarizations but may not be completely orthogonally polarized to each other.

The two optical signals 1660 are combined using combiner 1614. The combiner 1614 preferably is a polarized beam combiner, so that optical signals 1660 are minimally attenuated. In this example, the optical carriers 1669 are selected so that in the combined signal 1680, the upper optical sideband 1668A(U) of one signal is adjacent to the lower sideband 1668B(L) of the other signal.

Optical filter 1615 filters out the redundant sidebands: lower sideband 1668A(L) and upper sideband 1668B(U) in this case. Filter 1615 may also substantially attenuate the carriers 1669, particularly if, for example, the optical transmitters 1610 do not significantly suppress the carriers 1669. In this example, the optical filter 1615 is shown on the transmit side 1602, located after the optical combiner 1614. However, filtering typically can be implemented at a number of different locations and/or distributed between different locations. For example, an optical filter may also be placed on the receiver side, between fiber 120 and optical splitter 1632. One advantage of this placement is that this optical filter can also filter out noise generated during transmission, such as amplified spontaneous emission. In WDM applications, filters can also be used to suppress unwanted channels. As a final example, optical filters can be placed between the optical transmitters 1610 and optical combiner 1614 to filter out the unwanted sidebands and/or suppress the optical carriers.

In one embodiment, optical filter 1615 is a simple optical bandpass filter. In another embodiment, the optical filter 1615 is implemented as a comb filter, or a series of comb filters. Comb filters have periodic alternating pass and stop bands which repeat on a regular basis. For example, a comb filter might have alternating pass and stop bands, with the spectral response repeating with a periodicity of 100 GHz as shown in FIG. 26. Put in another way, the comb filter in FIG. 26 has pass bands spaced on 100 GHz centers. In one embodiment, the comb filter is implemented as an interleaver, which can also be used to combine sets of wavelengths in WDM applications. One advantage of using comb filters, including interleavers, is that tunable optical carriers 1669 can be accommodated. If the wavelength of the optical carriers 1669 is changed, the transmitter subsystem 1602 is still functional so long as the desired subbands fall in one of the pass bands of the comb filter (or series of comb filters).

For example, most WDM standards specify a grid of wavelengths in which the wavelengths are regularly spaced. By using a comb filter matched to this spacing, any of the wavelengths in the grid can be accommodated. This is because a comb filter has multiple pass bands which are periodically spaced. For example, the optical transmitters 1610 may be based on optical sources in which the wavelength is tunable to different wavelengths in the grid (e.g., a tunable laser). In contrast, an optical bandpass filter typically only has a single pass band. If the wavelength of the optical carriers 1669 is changed, this typically will require a different bandpass filter matched to the new wavelengths (or at least tuning of the location of the pass band).

To use a numerical example, assume that the WDM standard specifies a spacing of 100 GHz between different wavelength channels. By using a comb filter with the same periodicity, such as the one in FIG. 26, any of the wavelength channels can be accommodated. In a different embodiment, two comb filters are used, each with a periodicity of 200 GHz. One comb filter handles the even wavelength channels and the other comb filter handles the odd wavelength channels.

The resulting composite optical signal 1690 includes the upper sideband 1668A(U) from optical signal 1660A and the orthogonally polarized lower sideband 1668B(L) from optical signal 1660B. Each of the four subbands of composite optical signal 1690 carries different information, for example a different 10 Gbps data stream in one embodiment. Note that composite optical signal 1690 is a single sideband signal in that only one optical sideband of each subband is transmitted. The other optical sideband was removed by filter 1615. System 1600 is merely one example of an approach capable of generating optical single sideband signals. For example, see FIGS. 3-5 of co-pending U.S. patent application Ser. No. 09/747,261, "Fiber Optic Communications using Optical Single Sideband Transmission and Direct Detection," by Ting K. Yee, Peter H. Chang, and James F. Coward, filed Dec. 20, 2000 (now abandoned).

On the receive side, the receiver subsystem 1604 is similar to receiver subsystems 1104 and 1204. This particular receiver subsystem 1604 includes an optical splitter 1632 coupled to four heterodyne receivers 1630A-D. Each receiver 1630 recovers one of the four subbands 1662A, 1662B, 1666A or 1666B using heterodyne techniques, for example as described previously. Subbands 1662A and 1666A each use tone 1664A in the heterodyne detection. In other words, the tone 1664A is shared by two subbands. Similarly, subbands 1662B and 1666B share tone 1664B. The splitter 1632 splits the received composite optical signal 1690 into four optical signals 1692A-D, one for each heterodyne receiver 1630. Each optical signal 1692 includes the relevant subband plus tone. As before, the polarization controller within the receivers 1630 matches the polarization of the local oscillator to the polarization of the tone. When multiple subbands share the same tone, placing the tone in the middle of the subbands is preferred. Thus, the frequency separation between the tone and the furthest subband is minimized, thereby minimizing the attenuation of the detected electrical signal due to polarization mode dispersion.

In the embodiment shown in FIG. 16, the optical splitter 1632 includes a polarizing beam splitter module 1633 coupled to two optical splitters 1634A-B, each of which is coupled to an optical filter 1635A-D. The polarizing beam splitter module 1633 directs signal 1668A(U) to splitter 1634A and orthogonally polarized signal 1668B(L) to splitter 1634B. Each optical splitter 1634 further divides the incoming signal and the corresponding filters 1635 filter the appropriate subband and tone. For example, splitter 1634A splits the signal 1668A(U) into two identical signals, each of which is directed to one of the optical filters 1635A-B. Filter 1635A attenuates unwanted subband 1666A(U) and passes subband 1662A(U) and tone 1664A; while filter 1635B attenuates unwanted subband 1662A(U) and passes subband 1666A(U) and tone 1664A.

Figure 17:
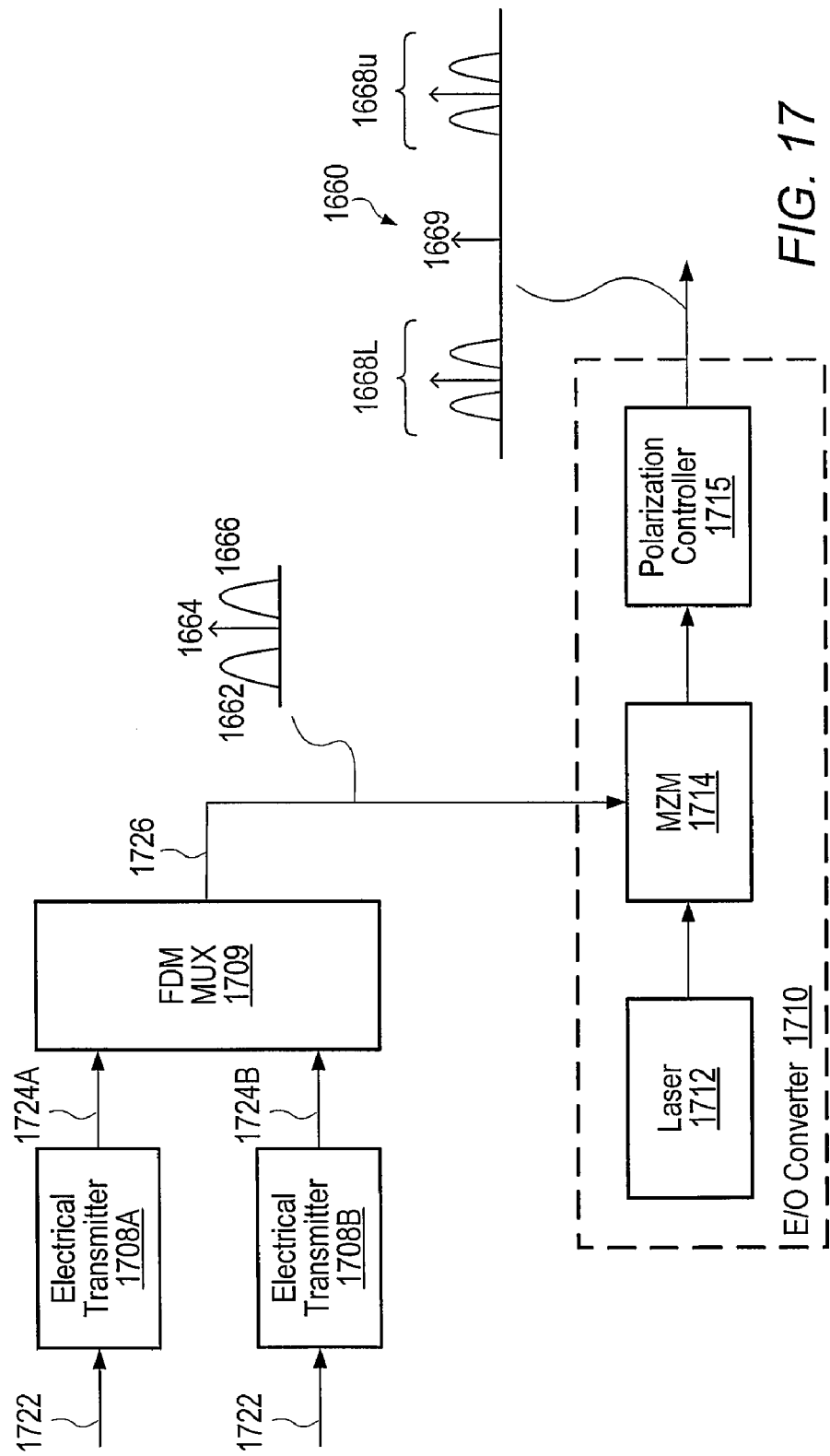
FIG. 17 is a block diagram of one embodiment of optical transmitter 1610.

FIG. 17 is a block diagram of one embodiment of optical transmitter 1610. This embodiment is similar to the transmitter subsystem 1202 of FIG. 12, with the following exceptions. First, in this particular example, there are only two electrical transmitters 1708 rather than the four shown in FIG. 12. In addition, the electrical transmitters 1708 may frequency division multiplex incoming electrical low-speed channels 1722 into the electrical channels 1724A-B. However, they may instead combine low-speed channels using other techniques, such as time division multiplexing, or they may not do any combining at all. For example, the incoming signal 1722 may simply be passed through to form channel 1724, in which case there is no need for electrical transmitter 1708. Second, the transmitter subsystem 1610 further includes a polarization controller 1715.

Briefly, the optical transmitter 1610 operates as follows. Each electrical transmitter 1708 produces an electrical channel 1724. The two electrical channels 1724A and 1724B correspond to the subbands 1662 and 1666 The FDM multiplexer 1709 combines the channels 1724 into a single electrical signal 1726 using conventional FDM techniques. A tone, which corresponds to tone 1664, is also added. The FDM multiplexer 1709 also includes filters, which filter out unwanted frequency components. The electrical signal 1726 entering the E/O converter 1710 includes two subbands and a tone.

In this embodiment, the E/O converter 1710 includes a laser 1712, a Mach-Zender modulator 1714, and a polarization controller 1715. The laser 1712 generates an optical carrier and the MZM 1714 modulates the optical carrier with the incoming electrical signal 1726. As described previously, the MZM may be operated at a number of different bias points. In this embodiment, it is biased at a point close to the $V_\pi$ points 404 of FIG. 4. Since the electrical signal 1726 has its own tone, reducing the optical carrier saves power. The result from MZM 1714 is a double sideband signal.

The polarization controller 1715 controls the polarization of this signal, yielding the optical signal 1660 with upper and lower optical sidebands 1668 and a reduced optical carrier 1669. In one approach, the polarization controller 1715 is a polarization rotator. In another embodiment, the output of the MZM 1714 is coupled to polarization-preserving fiber, which is physically rotated or twisted to achieve the desired polarization rotation. In a preferred embodiment, only one of the two optical transmitters 1610 requires a polarization controller 1715, in order to manipulate the polarization of one signal 1660 to be orthogonally polarized to the other signal 1660.

This approach has many benefits. For example, since optical signals 1668A(U) and 1668B(L) are orthogonally polarized, their interaction is significantly reduced. This, in turn, reduces unwanted nonlinear effects between differently polarized components, such as those due to four-wave mixing and cross-phase modulation. In addition, composite optical signal 1690 is generated by producing two optical signals 1660A and 1660B with separate carriers 1669A and 1669B but with sidebands 1668A(U) and 1668B(L) which are close to each other. The desired sidebands are selected by filtering. This approach allows the sidebands and their subbands to be more densely spaced in comparison to wavelength division multiplexing approaches.

As a final example, the subbands within each sideband are assembled using frequency division multiplexing in the electrical domain. Assembling subbands via frequency division multiplexing also results in many benefits, such as dense spacing of the subbands, efficient bandwidth utilization (both as a result of dense spacing and efficient modulation techniques), less susceptibility to frequency-dependent effects, non-linear fiber effects, and polarization mode dispersion (since each subband is concentrated over a narrow frequency band), and the ability to easily handle channels of different data rates and protocols.

Referring again to FIG. 16, the two optical carriers 1669 are selected so that the upper sideband 1668A(U) and lower sideband 1668B(L) are close enough to each other that they can be selected by filter 1615. To achieve this, the two optical sources 1712 in the two optical transmitters 1610 preferably are wavelength-locked to each other. It is even more desirable for each optical source 1712 to be wavelength-locked to a specific wavelength, in which event the difference between the two sources 1712 would also remain constant.

Figure 18A:
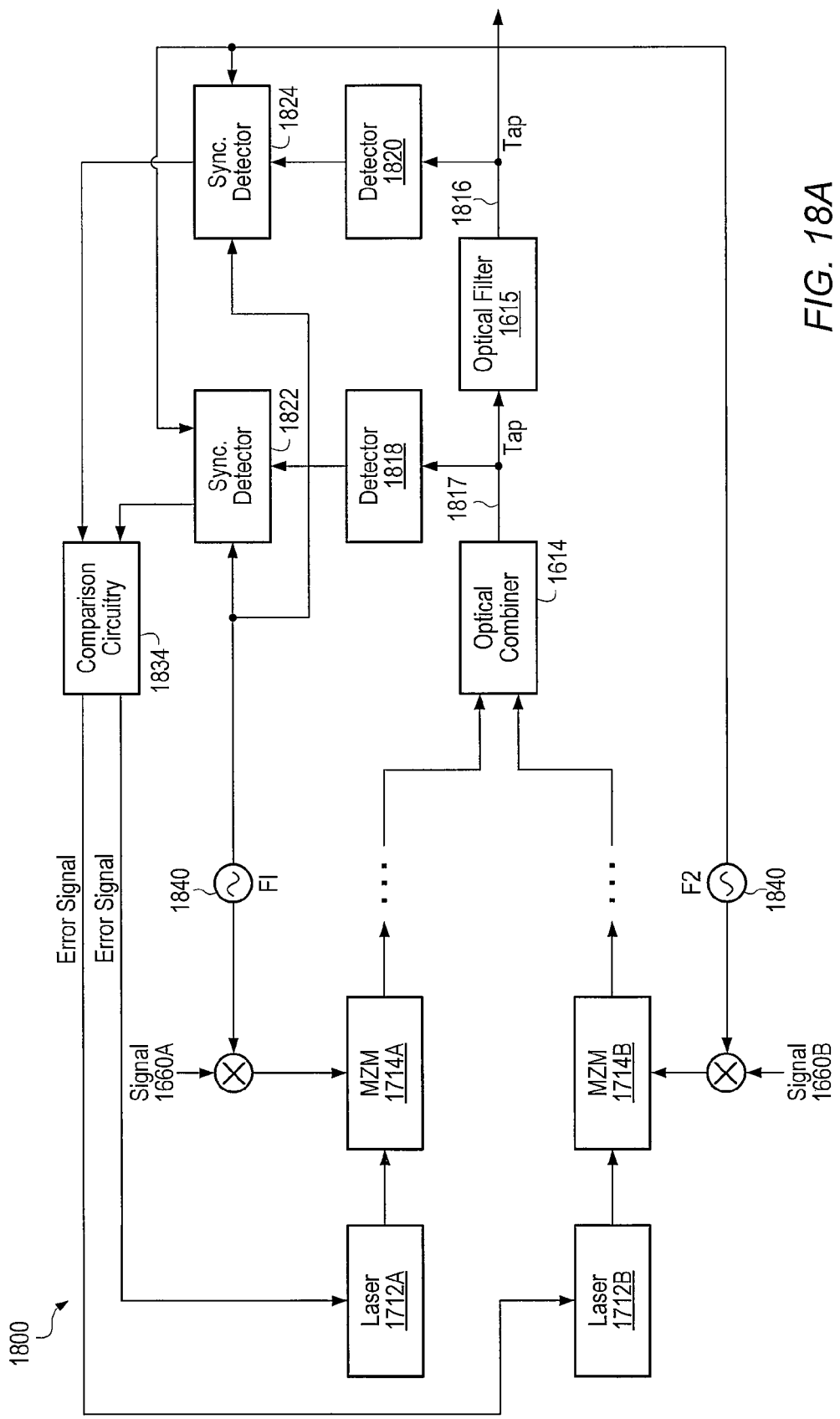
FIG. 18A is a block diagram of a wavelength locking device 1800 for use with system 1600.

FIG. 18A is a block diagram of a wavelength locking device 1800 for wavelength locking optical source 1712A to a specific wavelength. For convenience, only the relevant portions of transmitter subsystem 1602 are reproduced in FIG. 18A. The following additional components are also shown in FIG. 18A: a sinusoidal generator 1840 at frequency f1, optical taps 1816 and 1817, photodetectors 1820 and 1818, synchronous detectors 1824 and 1822, and comparison circuitry 1834.

These components are coupled as follows. The sinusoidal generator 1840 is coupled to the electrical input of MZM 1714A. It is also coupled to both synchronous detectors 1824 and 1822. One optical tap 1817 is located before the optical filter 1615, and the other optical tap 1816 is located after the optical filter 1615. Tap 1817 is coupled to photodetector 1818 to synchronous detector 1822 to comparison circuitry 1834. Similarly, tap 1816 is coupled to photodetector 1820 to synchronous detector 1824 to comparison circuitry 1834. The output of comparison circuitry 1834 is coupled to the optical source 1712A.

Wavelength-locking of optical source 1712A occurs as follows. The sinusoidal generator 1840 produces a reference signal at a frequency f1, which preferably is low, for example in the kHz range. The optical signal 1660A is modulated at this low frequency f1. In FIG. 18A, the modulation is achieved by adding the reference signal at frequency f1 to the electrical signal driving the MZM 1714A. In an alternative embodiment, the laser 1712A is directly modulated by the reference signal or by amplitude modulating the laser 1712A. Amplitude modulation generally results indirectly in frequency modulation. Direct laser modulation generally requires that the heterodyne detector can accommodate the associated frequency excursions of the laser. Whatever the method, the optical signal 1680 includes a small component at a frequency f1 offset from the optical carrier 1669A.

Optical tap 1817 taps a small portion of the optical signal 1680, prior to propagating through the filter 1815. This is detected by photodetector 1818, which results in mixing of the various frequency components in the tapped signal. Synchronous detector 1822 receives these various frequency components and also receives a reference signal at frequency f1. The synchronous detector 1822 locks in to the second harmonic component at 2 f1 (other harmonics, the fundamental or subharmonics can also be used) and outputs a signal proportional to the strength of this frequency component. Examples of synchronous detector 1822 include lock-in amplifiers and digital circuitry for implementing the same functionality. The output signal also indicates the strength of the optical carrier 1669A before filtering, since the frequency f1 is negligible with respect to that of the optical carrier. In a similar fashion, the optical tap 1816, photodetector 1820 and synchronous detector 1824 generate an output signal which indicates the strength of the optical carrier 1669A after filtering by optical filter 1615.

Comparison circuitry 1834 receives the signals from the two synchronous detectors 1822 and 1824 and compares them. In this particular example, the comparison circuitry take the ratio of the two signals. The ratio indicates the attenuation experienced by the optical carrier 1669A as it propagates through optical filter 1615, which in turn is a function of the wavelength of the optical carrier 1669A. Therefore, based on this ratio, the comparison circuitry 1834 generates an error signal which is used to adjust the wavelength of optical source 1712A.

Figure 18B:
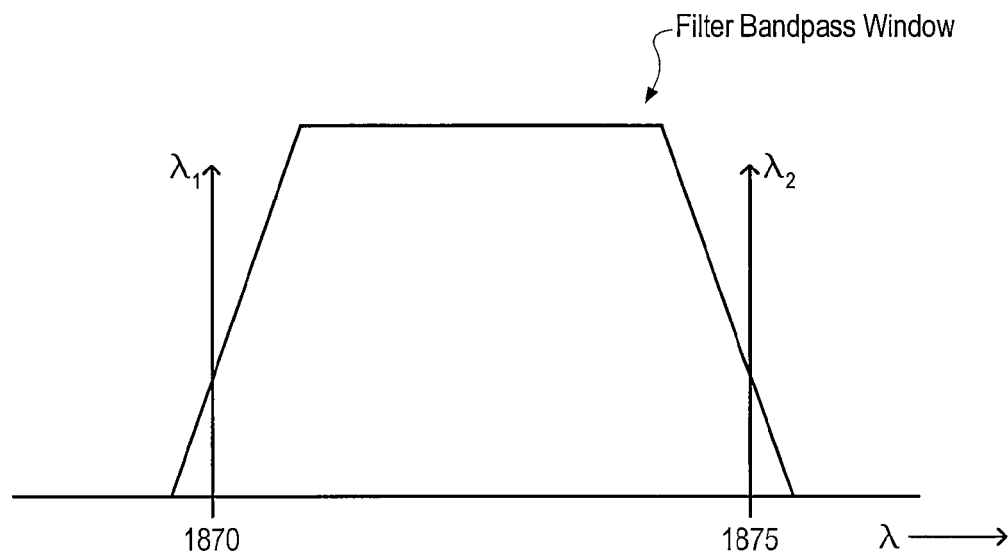
FIG. 18B is a graph illustrating the passband of optical filter 1615 as used in conjunction with wavelength locking device 1800.

As a specific example, FIG. 18B shows the transfer function of optical filter 1615 as a function of wavelength. Assume that optical carrier 1669A nominally is located at the wavelength 1870 on the lower edge of the filter transfer function and, at this wavelength, the filter 1615 has a 6 dB optical attenuation. In this implementation, this corresponds to a 12 dB attenuation of the relevant electrical signal. If the actual ratio is 12.1 dB of electrical attenuation, then the optical carrier 1669A must be at a wavelength lower than nominal and comparison circuitry 1834 generates an error signal to increase the wavelength. Similarly, if the actual ratio is only 11.9 dB of attenuation, then the error signal decreases the wavelength.

The same approach is used to wavelength-lock the optical carrier 1669B generated by optical source 1712B. In FIG. 18B, the nominal wavelength 1875 of carrier 1669B is also located at 6 dB of attenuation, but at the upper edge of the filter transfer function. Thus, too much attenuation means the wavelength is too high, and too little attenuation means the wavelength is too low.

Figure 18C:
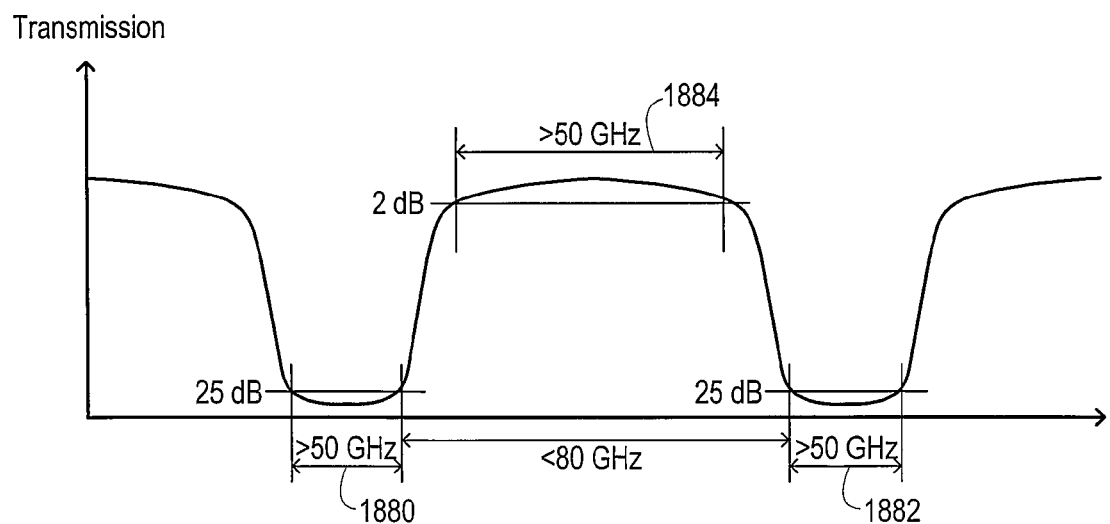
FIG. 18C is a graph illustrating the passband of one implementation of optical filter 1615.

FIG. 18C is a graph illustrating an implementation of optical filter 1615 based on Bragg grating filters. A single Bragg grating filter generally passes light except at one narrow band (i.e., around the wavelength at which the reflected light constructively interferes). In other words, the Bragg grating filter acts as a notch filter in transmission. The optical filter 1615 in FIG. 18C includes two Bragg grating filters. The first filter has a notch at location 1880 and the second filter has a notch at location 1882. Thus, the overall spectral characteristic includes the two notches at 1880 and 1882, as well as a pass band 1884 between the two notches. The notches and pass band are selected so that the pass band 1884 passes the two sidelobes 1668A(U) and 1668B(L), the two optical carriers 1669A and 1669B fall on the edges of the pass band, and the two notches block the redundant sidelobes 1668A(L) and 1668B(U). In a preferred embodiment, the Bragg grating filters are implemented as fiber Bragg grating filters. Other implementations, for example interleavers and thin film filters, will be apparent.

As usual, the wavelength locking device 1800 in FIG. 18A is merely an example. Other approaches to wavelength-locking may also be used, including those discussed in U.S. patent application Ser. No. 09/746,370, "Wavelengh-Locking of Optical Sources," by Shin-Sheng Tarng, et al., filed Dec. 20, 2000 (now U.S. Pat. No. 6,493,131, issued Dec. 10, 2002).

Figure 19:
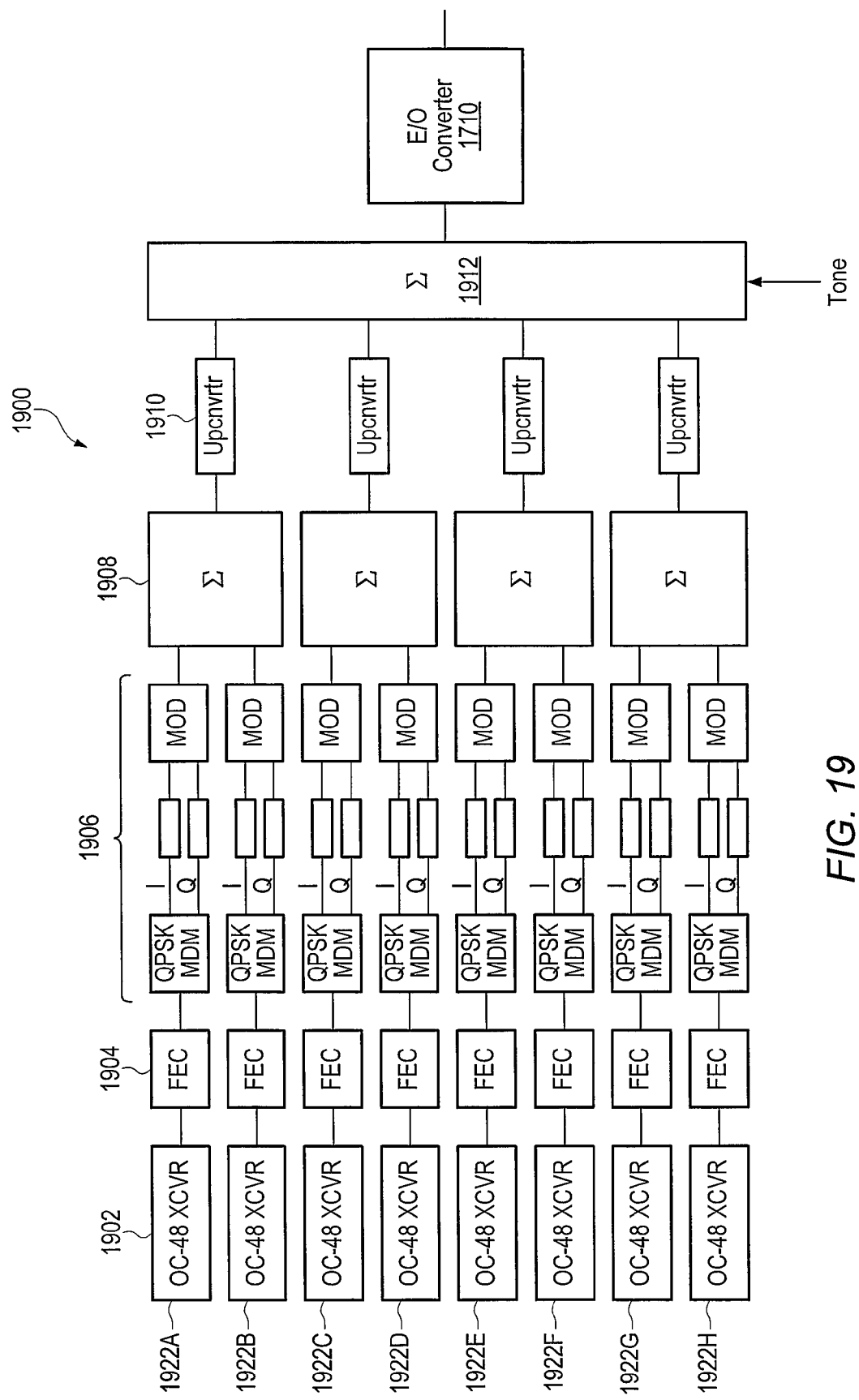
FIG. 19 is a block diagram of another embodiment of optical transmitter 1610.
Figure 20A:
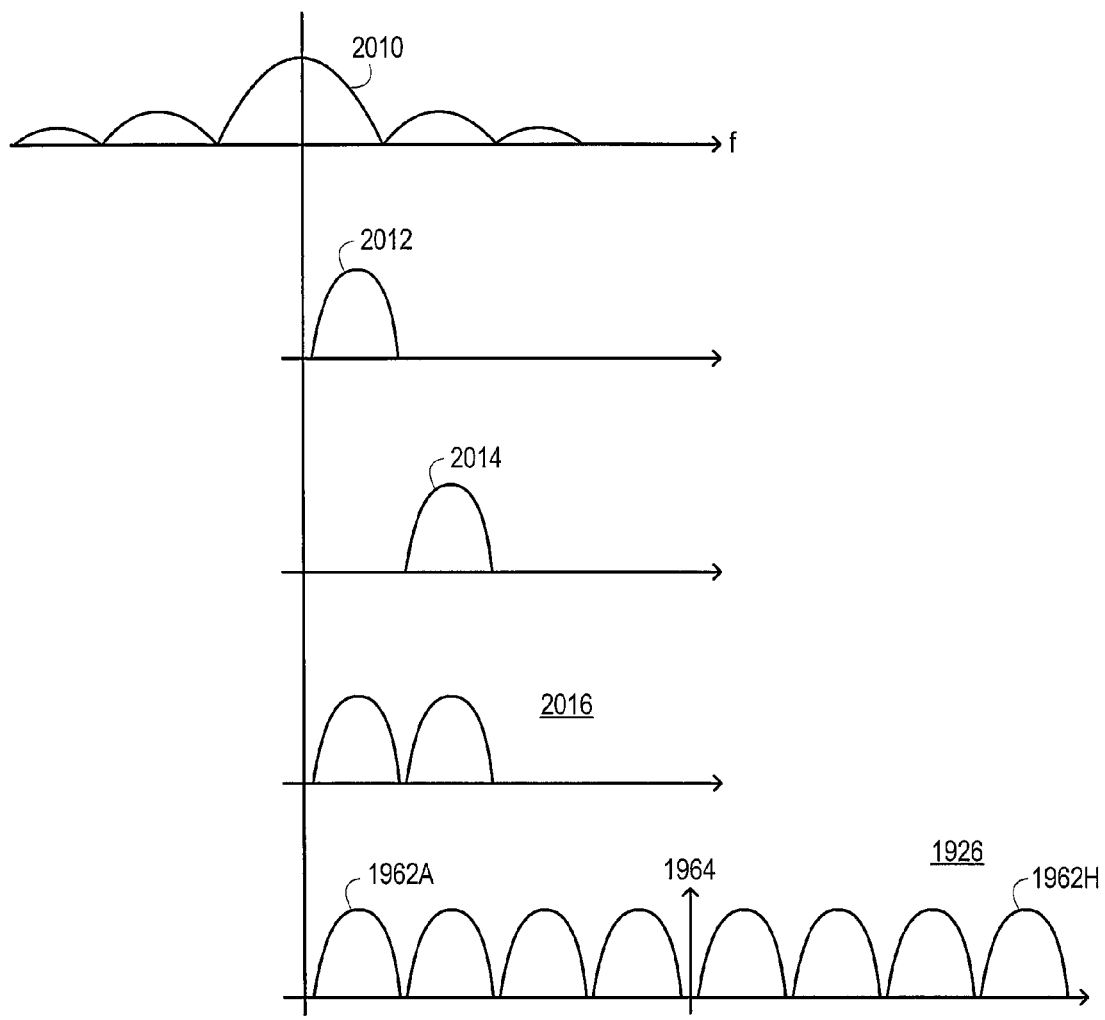
FIGS. 20A-20B are graphs illustrating the spectra and polarization of various signals in optical transmitter 1900.

FIGS. 19 and 20A illustrate another example embodiment 1900 of optical transmitter 1610. FIG. 19 is a block diagram of the optical transmitter 1900 and FIG. 20A shows spectra at various points in the optical transmitter 1900. This optical transmitter 1900 is designed to receive eight OC-48 signals 1922A-H and combine them into a single electrical signal 1926 with eight subbands 1962A-H (one for each OC-48 signal) and a single shared tone 1964.

The optical transmitter 1900 includes the following components. There are eight channels, one for each incoming OC-48 signal 1922, with each channel including an OC-48 transceiver 1902, error correction encoder 1904, and modulator 1906 coupled in series. The eight channels are coupled to four combiners 1908, two channels coupled to each combiner. Each combiner enters a frequency upconverter 1910, all of which are coupled to a final combiner 1912.

The optical transmitter 1900 operates as follows. Each OC-48 signal 1922 is transformed from optical to electrical signal by the transceiver 1902. The resulting spectrum 2010 is shown in FIG. 20A. The electrical signal is encoded by the FEC 1904 using a forward error correction code and then QPSK modulation is used in modulator 1906 to modulate an RF carrier. In more detail, QPSK modulator 1906 encodes the incoming data as I and Q channels, which are then used to modulate an electrical carrier. In this particular example, alternate channels use the same frequency carrier. That is channels A, C, E and G use one carrier, resulting in the spectrum 2012; but channels B, D, F and H produce spectrum 2014. The combiners 1908 combine the channels, two at a time, producing spectra 2016. These four signals are frequency shifted to different frequency locations by the frequency upconverters 1910 and then combined by combiner 1912 to yield the electrical signal 1926. This signal contains eight subbands 1962A-H, generated from the original spectra 2016. A tone 1964 is also added. This electrical signal is then fed to the E/O converter 1710, where it is processed the same as in FIG. 17. As mentioned previously, this is but one example of an optical transmitter. For example, other architectures for frequency division multiplexing the channels together will be apparent.

Figure 20B:
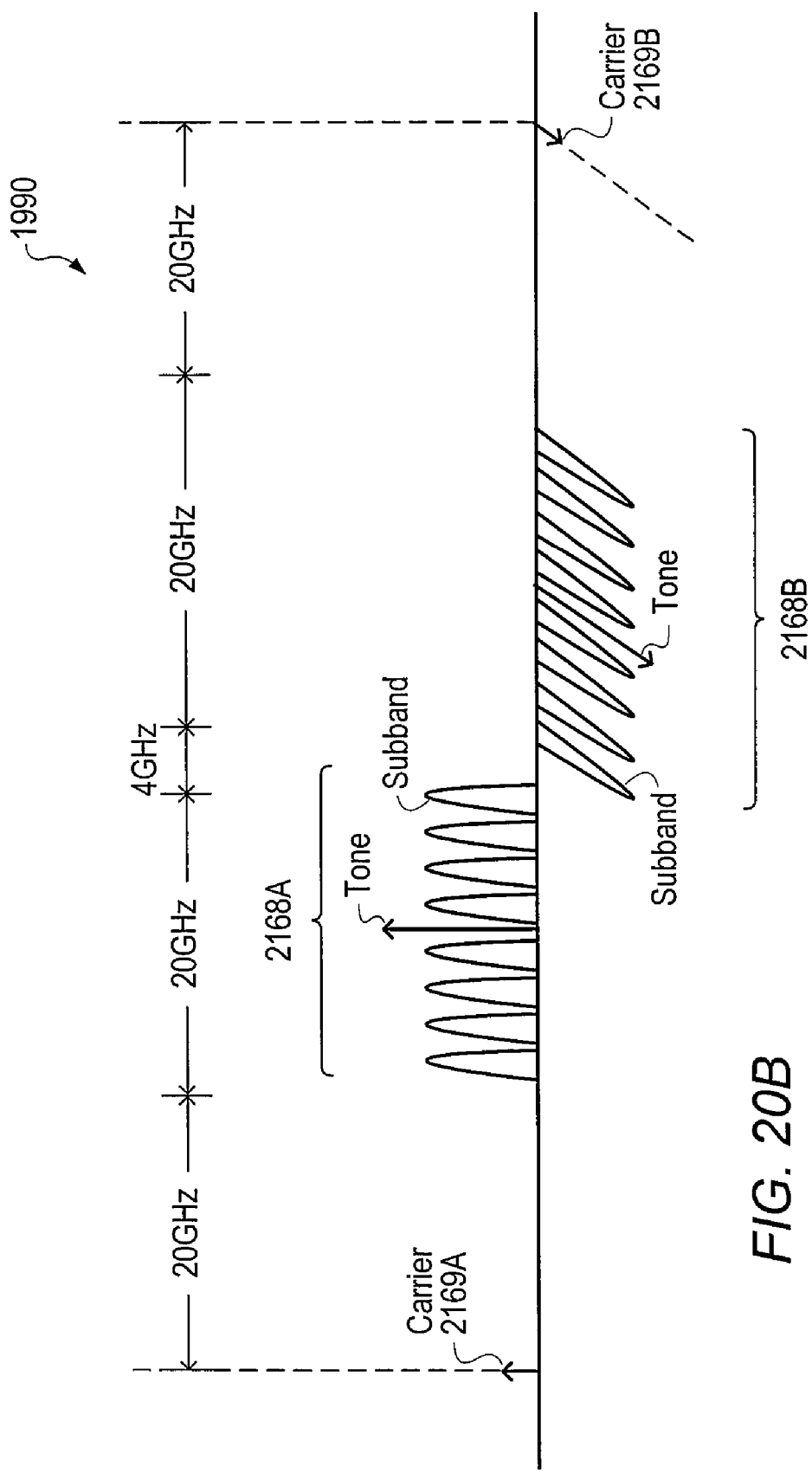

FIG. 20B shows the spectra of the composite optical signal 1990 generated by the overall system. As described above, one optical transmitter 1900A produces the signal group 2168A, which contains eight subbands and a tone. The optical transmitter 1900A also generates a reduced optical carrier 2169A, which may be further reduced by optical filtering. Similarly, the other optical transmitter 1900B produces optical carrier 2169B and signal group 2168B, with eight other subbands and a tone. In this particular example, each subband carries the equivalent of an OC-48 signal and is approximately 2.5 GHz wide so each signal group 2168 is a total of approximately 20 GHz wide. There is a 4 GHz guard band between the two groups, yielding a total spectral width of approximately 44 GHz for the composite optical signal. The optical carriers 2169 are offset by another 20 GHz, for a total carrier to carrier width of 84 GHz. Optical filtering suppresses the carriers, resulting in an effective signal width of 44 GHz (i.e., the bandwidth of the composite optical signal). The total capacity of the system is sixteen OC-48 subbands, or a total of approximately 40 Gbps. On the receive-side, heterodyne detection is accomplished by placing the local oscillator signal for a subband at the frequency of the corresponding carrier. The separation between local oscillator and subbands is therefore 20 GHz and is selected so that direct detection signals do not overlap spectrally with constituent signals on heterodyne detection, as described previously.

Figure 27:
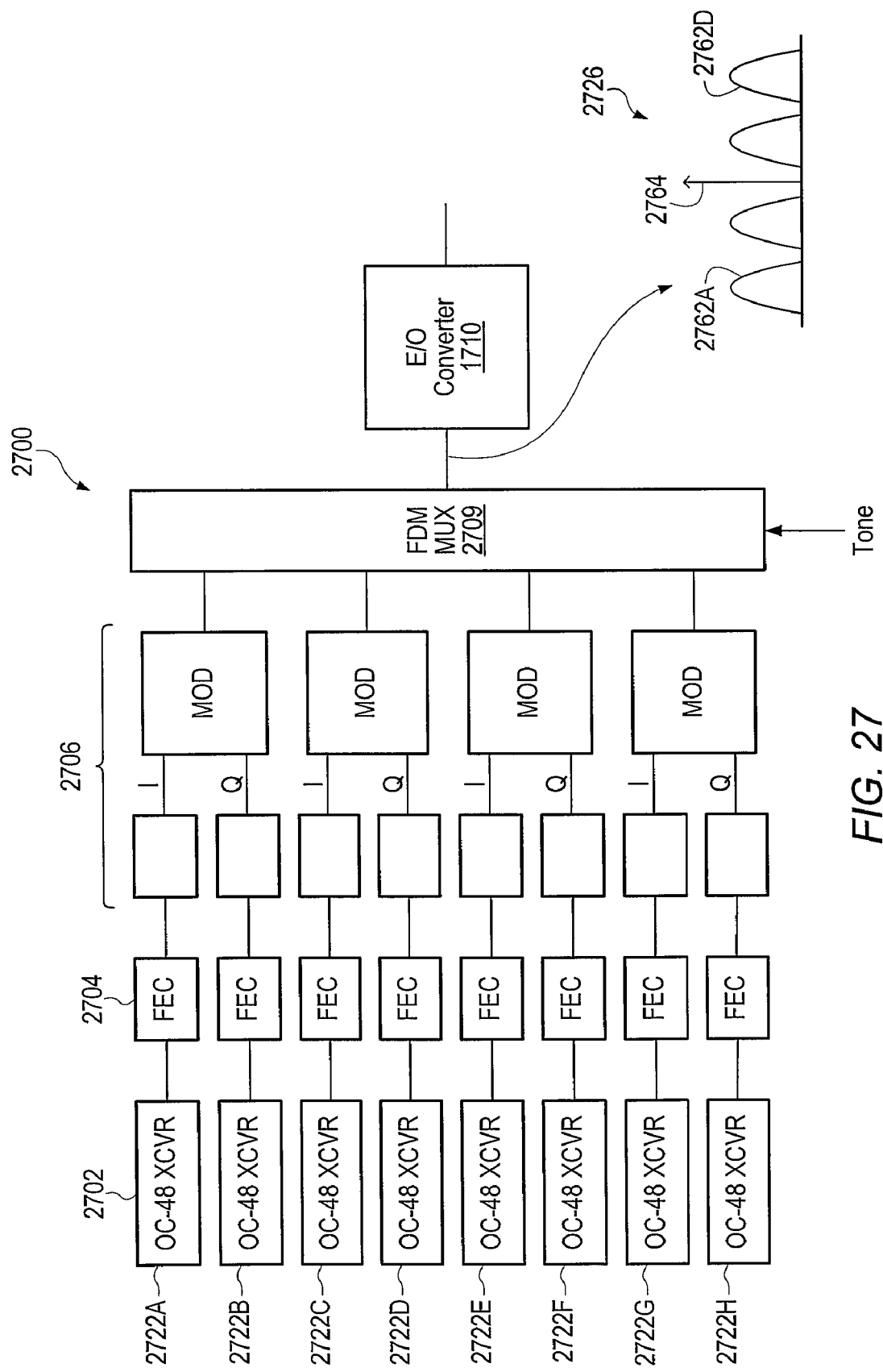
FIG. 27 is a block diagram of another embodiment of optical transmitter 1610.

FIG. 27 is a block diagram of another embodiment 2700 of optical transmitter 1610. This optical transmitter 2700 is designed to receive eight OC-48 signals 2722A-H and combine them into a single electrical signal 2726, as does optical transmitter 1900. However, the combining is implemented differently.

The optical transmitter 2700 includes the following components. There are eight channels, one for each incoming OC-48 signal 2722, with each channel including an OC-48 transceiver 2702 and error correction encoder 2704 coupled in series. The eight channels then share four modulators 2706, two channels per modulator. The four modulators 2706 are coupled to an FDM multiplexer 2709, which could be similar in construction to the combination 1908-1910-1912 shown in FIG. 19.

The optical transmitter 2700 operates as follows. Each OC-48 signal 2722 is transformed from optical to electrical signal by the transceiver 2702. The electrical signal is encoded by the FEC 2704 using a forward error correction code. QPSK modulators 2706 encode the eight incoming data streams as four I channels and four Q channels, and each I/Q pair is used to modulate an electrical carrier. The result is four QPSK modulated signals. Note that the OC-48 signals may be asynchronous with respect to each other. These four subbands plus a tone are combined by FDM multiplexer 2709 to yield the electrical signal 2726. This signal contains four subbands 2762A-D and a single shared tone 2764. Each subband 2762 contains the data from two OC-48 signals, for a data rate of approximately 5 Gbps per subband 2762. This electrical signal is then fed to the E/O converter 1710, where it is processed the same as in FIG. 17. A second similar optical transmitter produces a second, orthogonally polarized optical signal. The two optical signals are combined to generate a composite optical signal. The resulting composite optical signal contains two orthogonally polarized optical signals, each having the structure of four subbands plus tone.

Figure 21:
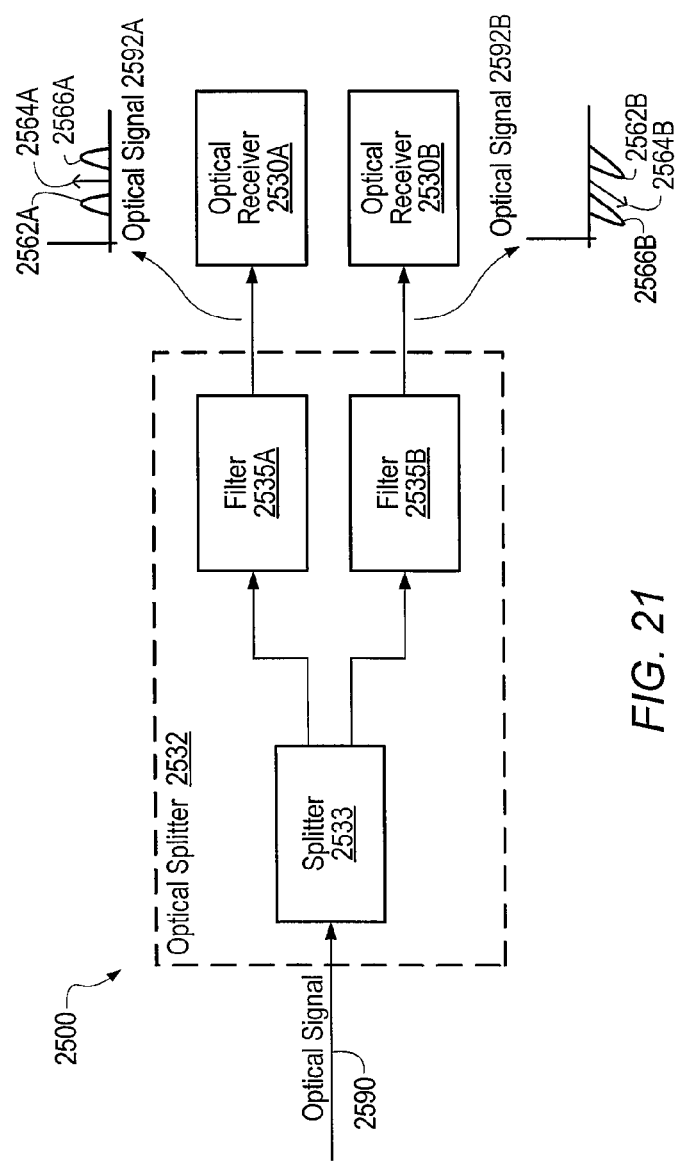
FIG. 21 is a block diagram of another embodiment of receiver subsystem 1604.

FIG. 21 is a block diagram of another embodiment 2500 of receiver subsystem 1604. This particular receiver subsystem 2500 includes an optical splitter 2533 coupled to two heterodyne receivers 2530A-B. Each receiver 2530 processes one of the two orthogonally polarized signals 1668A(U) and 1668B (L), respectively, using heterodyne techniques, for example as described previously. Subbands 2562A and 2566A use tone 2564A in the heterodyne detection. Similarly, subbands 2562B and 2566B use tone 2564B. The splitter 2533 splits the received composite optical signal 2590 into two optical signals 2592A-B, one for each heterodyne receiver 2530. Each optical signal 2592 includes the relevant two subbands plus tone. Placing the tone between the two subbands reduces the frequency separation between tone and subband, thereby minimizing the attenuation of the detected electrical signal due to polarization mode dispersion. In this implementation, the optical splitter 2533 includes optical splitter coupled to two optical filters 2535A-B. As before, the polarization controller in the receivers 2530 matches the polarization of the local oscillator to the polarization of the tone.

Figure 22:
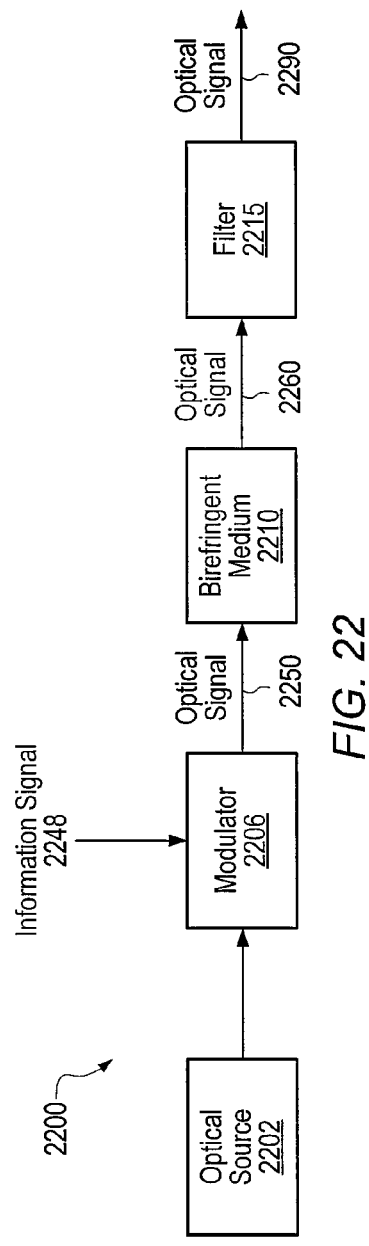
FIG. 22 is a block diagram of another embodiment of optical transmitter 1610.

FIG. 22 is a block diagram of another embodiment 2200 of transmitter subsystem 1602 utilizing a birefringent medium. This embodiment includes a laser 2202, modulator 2206, birefringent medium 2210, and optical filter 2215 coupled in series. Light from optical source 2202 passes through modulator 2206 to generate optical signal 2250. In this particular example, the information signal 2248 entering the MZM contains sixteen subbands, each based on an OC-48 signal, for a total bandwidth of approximately 40 GHz. The optical signal 2250 generated by the MZM 2206 is a double sideband version of this, with a suppressed carrier. Birefringent medium 2210 has group velocity dispersion. Hence, when optical signal 2250 passes through birefringent medium 2210, each subband experiences a different degree of phase retardation between the birefringent axes. In a preferred embodiment, birefringent medium 2210 is a birefringent fiber. Other polarization controlling devices which introduce varying polarizations can also be used. The optical signal 2260 leaving the birefringent medium still has two optical sidebands. Optical filter 2215 substantially attenuates the redundant sideband and may further suppress the carrier, resulting in composite optical signal 2290. In an alternate embodiment, the optical filter 2215 is located before the birefringent medium 2210.

FIG. 23 shows composite optical signal 2290 in more detail. The graph shows power as a function of frequency and the figures below the graph illustrate the corresponding polarization states. As shown in the power spectrum, the optical signal 2290 includes sixteen subbands (or channels) 2294A-2294P, tone 2296, and suppressed cater 2297. The lower optical sideband of optical signal 2290 is substantially attenuated. As a consequence of the birefringence, the polarization of each channel is slightly different. In this example, channel 1 (i.e., 2294A) is linearly polarized 2298A and channel 16 (2294P) is similarly linearly polarized 2298E. In between, the phase retardation varies continuously, so that the polarization gradually transforms from linear vertical 2298A, to fight circular 2298B, to linear horizontal 2298C, to left circular 2298D, back to linear vertical 2298E. The polarizations generally are elliptical. The varying polarization serves to reduce four-wave mixing and cross-phase modulation between the channels.

As is noted throughout, the systems described herein are merely examples. It is not feasible to explicitly describe all possible embodiments which are based either on the principles illustrated or on combinations of these principles. For example, systems 1200, 1600, 1900 and 2700 discuss at length the use of electrical frequency division multiplexing for combining signals. System 1100, 1900 and 2700 discusses the use of carriers at different wavelengths for combining signals. Systems 1600, 1900, 2200, 2500 and 2700 discuss the use of different polarizations in order to improve performance. Systems 1600, 1900 and 2700 discuss at length the use of optical single sideband transmission. System 1600 discusses at length the approach of using separated optical carriers to produce sidebands which are close to each other, and then selecting the desired sidebands via an optical filter. System 2200 discusses at length the approach of using a single optical transmitter to produce a signal with multiple subbands of varying polarizations. However, this does not imply that each technique can only be used in the systems which discuss the technique at length or only in the combinations which are explicitly illustrated.

For example, FIGS. 24A-25B illustrate other types of composite optical signals. FIG. 24 illustrates various signals which include four subbands. The corresponding tones, if any, have been omitted for clarity. In FIG. 24A, the composite optical signal 2412 includes four subbands of the same polarization situated near each other. For composite optical signal 2412, the spectral width of the guard band (i.e. gap) between the subbands is generally less than the spectral width of the subbands. Note that this signal could be generated by using the two optical carrier approach shown in FIG. 16, but without the cross-polarization. In FIG. 24B, the four subbands are situated near each other, but they are divided into two groups of two subbands each and the two groups are orthogonally polarized with respect to each other. In FIG. 24C, the subbands are again divided into two groups of two subbands each, but here the groups are widely separated from each other. Because of the wide separation of the subbands, composite optical signal 2416 will experience substantially less cross-phase modulation and four-wave mixing between the more widely separated subbands. FIG. 24C shows the subbands as the same polarization, but they could also have varying polarizations. As a final example, FIG. 24D shows a composite optical signal 2428 in which the subbands alternate in polarization. In other words, the subbands of one polarization are interleaved with the subbands of the orthogonal polarization.

FIG. 25 illustrates various ways of filtering optical signals based on two separate optical carriers. These are illustrated in the context of optical signals 1660A and 1660B of FIG. 16. In FIG. 16, the optical carriers 1669 for these two signals was selected so that upper sidelobe 1668A(U) was adjacent to but at a lower frequency than lower sidelobe 1668B(L). In FIG. 25A, these two sidelobes are still adjacent, but lower sidelobe 1668B(L) is now at a lower frequency than upper sidelobe 1668A(U). The optical filter 1615, shown by the dashed outline, selects both sidelobes. In FIG. 25B, the two upper sidelobes 1668A(U) and 1668B(U) are adjacent to each other and selected by the filter 1615.

Although the invention has been described in considerable detail with reference to certain preferred embodiments thereof, other embodiments are possible. Therefore, the scope of the appended claims should not be limited to the description of the preferred embodiments contained herein.

What is claimed is:

1. A transmission subsystem for a communications system, the transmission subsystem comprising:
   a wavelength locking device, wherein the wavelength locking device is coupled to receive a first composite signal comprising a first optical signal including a first optical carrier and a second optical signal having a second optical carrier, and a second composite signal;
   an optical filter, wherein the optical filter is configured to produce the second composite signal by filtering the first composite signal such that a lower optical sideband of the first optical signal and a an upper optical sideband of the second optical signal are suppressed during said filtering;
   wherein the wavelength locking device is configured to generate respective indications of the strengths of the first and second optical carriers in the first and second composite signals and lock a frequency separation between the first and second optical carriers using the respective indications of strength, wherein the frequency separation is substantially equal to the bandwidth of the optical filter.

2. The transmission subsystem as recited in claim 1, wherein the transmission subsystem includes a first optical transmitter configured to generate the first optical signal and a second optical transmitter to generate the second optical signal.

3. The transmission subsystem as recited in claim 2, wherein the transmission subsystem includes an optical combiner coupled to the first and second optical transmitters, and wherein the optical combiner is configured to optically combine the first and second optical signals into the first composite signal.

4. The transmission subsystem as recited in claim 3, wherein the transmission subsystem further comprises:
a first optical tap coupled between the optical combiner and the optical filter and configured to tap the first composite signal;
a second optical tap coupled to the optical filter and configured to tap the second composite signal.

5. The transmission subsystem as recited in claim 4, wherein the wavelength locking device comprises:
a first sinusoidal generator coupled to the first optical transmitter and configured to generate a modulation frequency f1 used to modulate the first optical signal;
a second sinusoidal generator coupled to the second optical transmitter and configured to generate a modulation frequency f2 used to modulate the second optical signal
a first photodetector coupled to the first optical tap;
a first synchronous detector coupled to the first photodetector and to the sinusoidal generators, and configured to detect frequency components that are integer multiples of the frequencies fi and f2 and provide indications of the strength of the first and second optical carriers in the first sample;
a second photodetector coupled to the second optical tap;
a second synchronous detector coupled to the second photodetector and to the sinusoidal generators, and configured to detect frequency components at the same frequencies as the frequency components detected by the first synchronous detector and provide indications of the strength of the first and second optical carriers in the second sample; and
comparison circuitry coupled to the synchronous detectors configured to compare the indication of the strength of the first optical carrier in the first sample to the indication of the strength of the first optical carrier in the second sample, and further configured to compare the indication of the strength of the second optical carrier in the first sample to the indication of the strength of the second optical carrier in the second sample, and generate errors signals for the optical transmitters based on the indications of the strengths of the first and second optical carrier signals in each of the first and second samples.

6. A method comprising:
generating a first optical signal having a first carrier and a second optical signal having a second carrier;
combining the first optical signal and the second optical signal into a first composite signal;
filtering the first composite signal to produce a second composite signal, wherein said filtering includes selecting a lower optical sideband from the first optical signal and an upper optical sideband from the second optical signal;
tapping the first composite signal;
tapping the second composite signal;
generating respective indications of the strengths of the first and second optical carriers in each of the first and second composite signals; and
locking a frequency separation between the first and second optical carriers based on the respective indications of signal strength, wherein the frequency separation is substantially equal to the bandwidth of a filter that performs said filtering.

7. A communications system comprising:
a transmission subsystem, wherein said transmission subsystem includes:
first means for generating a first optical signal having a first optical carrier signal;
second means for generating a second optical signal having a second optical carrier signal, wherein the first optical signal has a different polarization than the second optical signal;
third means for combining the first and second optical signals into a first composite signal;
fourth means for receiving the first composite optical signal and selecting a lower optical sideband from the first optical signal and an upper optical sideband from the second optical signal to produce a second composite signal;
a first optical tap for tapping the first composite signal;
a second optical tap for tapping the second composite signal; and
fifth means for locking a frequency separation between the first optical signal and the second optical signal, said frequency separation being substantially equal to a filtering bandwidth of said fourth means, wherein said locking a frequency separation is performed based on respective indications of the signal strengths of the first and second optical carrier signals in the first composite signal and respective indications of signal strengths of the first and second optical carrier signals in the second composite signal.

8. The communications system as recited in claim 7, wherein the communications system further comprises a receiver subsystem for recovering subbands of information from said second composite signal, wherein the receiver subsystem is coupled to the transmission subsystem by an optical fiber, wherein the receiver subsystem includes:
a polarizing splitter module for splitting the second composite optical signal according to polarization; and
a heterodyne receiver coupled to the polarizing splitter for recovering a subband.

9. A communications system comprising:
a transmitter subsystem, wherein the transmitter subsystem includes:
a first optical transmitter configured to generate a first optical signal that includes a first optical carrier signal;
a second optical transmitter configured to generate a second optical signal that includes a second optical carrier signal;
an optical combiner configured to optically combine the first and second optical signals into a first composite signal;
an optical filter coupled to receive the first composite signal from the optical combiner and configured to produce a second composite signal by selecting a lower optical sideband from the first optical signal and an upper optical sideband from the second optical signal;
a first optical tap configured to tap the first composite signal to produce a first sample;
a second optical tap configured to tap the second composite signal to produce a second sample; and
a wavelength-locking device coupled to the first optical tap and to the second optical tap and configured to generate indications of the strengths of the first and second optical carrier signals in the first and second samples and use the indications of the strengths of the first and second optical carrier signals to lock a frequency separation therebetween, wherein the frequency separation is substantially equal to the bandwidth of the optical filter.

10. The communications system as recited in claim 9, wherein the first and second optical signals are orthogonally polarized with respect to each other.

11. The communications system as recited in claim 10, wherein each of the first and second optical transmitters includes:
   an optical source for producing an optical carrier; and
   an electro-optic modulator coupled to the optical source for modulating the optical carrier with a subband of information; and
   wherein at least one of the first and second optical transmitters further includes:
   a polarization controller for making a polarization of the optical signal orthogonal to a polarization of the other optical signal.

12. The communications system as recited in claim 10, wherein at least one of the first and second optical transmitters includes:
   a wavelength-tunable optical source, wherein a wavelength of the optical signal can be tuned by tuning the wavelength-tunable optical source; and
   wherein the transmitter subsystem includes a comb filter having periodically spaced pass bands coupled to the optical combiner.

13. The communications system as recited in claim 9, wherein each of the first and second optical signals contain at least two subbands and a tone, wherein at least one of the subbands includes asynchronous I and Q signals.

14. The communications system as recited in claim 9, wherein the wavelength locking device includes:
   a first sinusoidal generator coupled to the first optical transmitter and configured to generate a modulation frequency f1 used to modulate the first optical signal;
   a second sinusoidal generator coupled to the second optical transmitter and configured to generate a modulation frequency f2 used to modulate the second optical signal;
   a first photodetector coupled to the first optical tap;
   a first synchronous detector coupled to the first photodetector and to the first and second sinusoidal generators and configured to detect frequency components that are integer multiples of the frequencies f1 and f2 and provide indications of the strengths of the first and second optical carrier signals in the first sample;
   a second photodetector coupled to the second optical tap;
   a second synchronous detector coupled to the second photodetector and to the first and second sinusoidal generators and configured to detect frequency components at the same frequencies as the frequency components detected by the first synchronous detector and provide indications of the strengths of the first and second optical carrier signals in the second sample; and
   comparison circuitry coupled to the synchronous detectors configured to compare the indication of the strength of the first optical carrier signal in the first sample to the indication of the strength of the first optical carrier signal in the second sample, and further configured to compare the indication of the strength of the second optical carrier signal in the first sample to the indication of the strength of the second optical carrier signal in the second sample, and generate errors signals for the optical transmitters based on the indications of the strengths of the first and second optical carrier signals in each of the first and second samples.

15. The communications system as recited in claim 9, wherein the wavelength locking device is configured to:
   generate a first signal indicative of a first value, wherein the first value corresponds to the ratio between an amount of light from the first optical source present before filtering and the amount of light from the first optical source present after filtering; and
   generate a second signal indicative of a second value, wherein the second value corresponds to the ratio between an amount of light from the second optical source present before filtering and an amount of light from the second optical source present after filtering.

16. The communications system as recited in claim 15, wherein the wavelength locking device is further configured to
   adjust the wavelength of the first optical carrier based on the ratio indicated by the first value such that the wavelength of the first optical carrier is situated at approximately the upper end of the filter bandpass region; adjust the wavelength of the second optical carrier based on the ratio indicated by the second value such that the wavelength of the second optical carrier is situated at approximately the lower end of the filter bandpass region.

17. A communications system comprising:
   a transmitter subsystem, wherein the transmitter subsystem includes:
   first and second optical transmitters configured to generate first and second optical signals, respectively, the first and second optical signals having first and second optical cater signals, respectively;
   first and second external optical modulators configured to receive and modulate the first and second optical signals, respectively, wherein each of the first and second optical modulators are Mach Zender Modulators (MZM's);
   an optical combiner coupled to receive the first and second optical signals from the first and second external optical modulators, respectively, and configured to optically combine the first and second optical signals into a first composite signal;
   an optical filter coupled to receive the first composite signal from the optical combiner and configured to produce a second composite signal by selecting a lower optical sideband from the first optical signal and an upper optical sideband from the second optical signal;
   a first optical tap configured to tap the first composite signal to produce a first sample;
   a second optical tap configured to tap the second composite signal to produce a second sample; and
   a wavelength-locking device coupled to the first optical tap and to the second optical tap and configured to lock a frequency separation between the first and second carrier signals, wherein the frequency separation is substantially equivalent to the bandwidth of the optical filter, wherein the wavelength locking device is configured to generate respective indications of the strength of each of the first and second optical carrier signals in each of the first and second samples, and configured to lock the frequency separation based on the respective indications of strength.

18. A communications system comprising:
a transmitter subsystem comprising:

a first optical transmitter configured to generate a first optical signal having a first optical carrier;

a second optical transmitter configured to generate a second optical signal having a second optical carrier;

a wavelength locking device, wherein the wavelength locking device is coupled to receive a first composite signal and a second composite signal, wherein the first composite signal includes the first optical signal and the second optical signal;

an optical filter configured to produce the second composite signal by filtering the first composite signal such that a lower optical sideband of the first optical signal and a an upper optical sideband of the second optical signal are suppressed during said filtering;

wherein the wavelength locking device is configured to generate respective indications of the strengths of the first and second optical carriers in each of the first and composite signals and lock a frequency separation therebetween based on the respective indications of strength, wherein the frequency separation is substantially equal to the bandwidth of the optical filter; and a receiver subsystem coupled to the transmitter subsystem by an optical fiber and configured to recover subbands of information from the second composite signal, wherein the receiver subsystem comprises:

a polarizing splitter module configured to split the second composite optical signal according to polarization of the subbands; and a plurality of heterodyne receivers coupled to the polarizing splitter module and configured to recover the subbands.

19. The communications system as recited in claim 18, wherein the first and second optical signals are orthogonally polarized with respect to each other.

20. The communications system as recited in claim 19, wherein each of the first and second optical transmitters includes:

an optical source configured to produce its corresponding optical carrier; and an electro-optic modulator coupled to the optical source and configured to modulate the corresponding optical carrier with a subband of information; and wherein at least one of the first and second optical transmitters further comprises:

a polarization controller configured to make a polarization of the optical signal for each transmitter orthogonal to a polarization of the optical signal of the other transmitter.

21. The communications system as recited in claim 19, wherein at least one of the first and second optical transmitters includes:

a wavelength-tunable optical source, wherein a wavelength of the optical signal can be tuned by tuning the wavelength-tunable optical source; and wherein the transmitter subsystem includes a comb filter having periodically spaced pass bands coupled to the optical combiner.

22. The communications system as recited in claim 18, wherein the transmission subsystem includes an optical combiner coupled to the first and second optical transmitters, wherein the optical combiner is configured to optically combine the first and second optical signals into the first composite signal.

23. The communications system as recited in claim 22, wherein the transmission subsystem further comprises:

a first optical tap coupled between the optical combiner and the optical filter and configured to tap the first composite signal;

a second optical tap coupled to the optical filter and configured to tap the second composite signal.

24. The communications system as recited in claim 23, wherein the wavelength locking device includes:

a first sinusoidal generator coupled to the first optical transmitter and configured to generate a modulation frequency fi used to modulate the first optical signal;

a second sinusoidal generator coupled to the second optical transmitter and configured to generate a modulation frequency f2 used to modulate the second optical signal a first photodetector coupled to the first optical tap;

a first synchronous detector coupled to the first photodetector and to the sinusoidal generators, and configured to detect frequency components that are integer multiples of the frequencies f1 and f2 and provide indications of the strengths of the first and second optical carriers in the first sample;

a second photodetector coupled to the second optical tap;

a second synchronous detector coupled to the second photodetector and to the sinusoidal generators, and configured to detect frequency components at the same frequencies as the frequency components detected by the first synchronous detector and provide indications of the strengths of the first and second optical carriers in the second sample; and comparison circuitry coupled to the synchronous detectors configured to compare the indication of strength of the first optical carrier in the first sample to the indication of strength of the first optical carrier in the second sample, and further configured to compare the indication of strength of the second optical carrier in the first sample to the indication of strength of the second optical carrier in the second sample, and generate errors signals for the optical transmitters based on the indications of the strengths of the first and second optical carrier signals in each of the first and second samples.

25. A transmission subsystem for a communications system, the transmission subsystem comprising:

a first optical transmitter configured to generate a first optical signal including a first optical carrier signal;

a second optical transmitter configured to generate a second optical signal including a second optical carrier signal; and a wavelength locking device, wherein the wavelength locking device is coupled to a first optical tap in order to receive a first composite signal comprising the first optical signal and the second optical signal, and further coupled to a second optical tap in order to receive a second composite signal, wherein the wavelength locking device includes:

a first synchronous detector coupled to receive a first sample taken from the first optical tap and configured to generate respective indications of the strengths of the first and second optical carriers in the first sample;

a second synchronous detector coupled to receive a second sample taken from the second optical tap and configured to generate respective indications of the strengths of the first and second optical carriers in the second sample; and comparison circuitry coupled to the synchronous detectors configured to compare the indication of strength of the first optical carrier in the first sample to the indication of strength of the first optical carrier in the second sample, and further configured to compare the indication of strength of the second optical carrier in the first sample to the indication of strength of the second optical carrier in the second sample, and generate errors signals for the first and second optical transmitters based on the indications of the strengths of the first and second optical carrier signals in each of the first and second samples.

26. The transmission subsystem as recited in claim 25, wherein the wavelength locking device is configured to lock a frequency separation between the first optical carrier signal and the second optical carrier signal to a predetermined value.

27. The transmission subsystem as recited in claim 26, wherein the frequency separation is substantially equal to the bandwidth of an optical filter configured to produce the second composite signal by filtering the first composite signal.

* * * * *